(12) United States Patent
Wang et al.

(10) Patent No.: US 11,971,627 B2
(45) Date of Patent: Apr. 30, 2024

(54) DISPLAY PANEL AND METHOD FOR PREPARING SAME, AND DISPLAY APPARATUS

(71) Applicants: BEIJING BOE DISPLAY TECHNOLOGY CO., LTD., Beijing (CN); BOE Technology Group Co., Ltd., Beijing (CN)

(72) Inventors: Feifei Wang, Beijing (CN); Hongming Zhan, Beijing (CN); Xibin Shao, Beijing (CN); Lintao Ji, Beijing (CN)

(73) Assignees: BEIJING BOE DISPLAY TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 167 days.

(21) Appl. No.: 17/629,416

(22) PCT Filed: Apr. 26, 2021

(86) PCT No.: PCT/CN2021/090021
§ 371 (c)(1),
(2) Date: Jan. 24, 2022

(87) PCT Pub. No.: WO2021/233085
PCT Pub. Date: Nov. 25, 2021

(65) Prior Publication Data
US 2022/0260878 A1    Aug. 18, 2022

(30) Foreign Application Priority Data

May 18, 2020 (CN) .......................... 202010420617.4

(51) Int. Cl.
*G02F 1/13363* (2006.01)
*G02F 1/1335* (2006.01)
(Continued)

(52) U.S. Cl.
CPC .. *G02F 1/133637* (2021.01); *G02F 1/133633* (2021.01); *G02F 1/133738* (2021.01);
(Continued)

(58) Field of Classification Search
CPC ........... G02F 1/133637; G02F 1/133633; G02F 1/133638; G02F 1/133514; G02F 1/1337; G02B 5/3083
See application file for complete search history.

(56) References Cited

U.S. PATENT DOCUMENTS 6,078,375 A * 6/2000 Matsumoto ....... G02F 1/134363
349/123
2004/0227879 A1    11/2004 Elman et al.
(Continued)

FOREIGN PATENT DOCUMENTS

CN    1659471 A    8/2005
CN    1745331 A    3/2006
(Continued)

OTHER PUBLICATIONS

International Search Report for PCT/CN2021/090021 dated Jul. 30, 2021.
(Continued)

*Primary Examiner* — Jia X Pan
(74) *Attorney, Agent, or Firm* — Ling Wu; Stephen Yang; Ling and Yang Intellectual Property

(57) ABSTRACT

Provided are a display panel and a method for preparing same, and a display apparatus. The display panel includes an array substrate and an opposite substrate, which are oppositely arranged, and a liquid crystal layer, which is arranged between the array substrate and the opposite substrate, wherein a compensation layer is arranged on the array substrate or the opposite substrate, and an included angle between an optical axis direction of the compensation layer (Continued)

and an initial optical axis direction of liquid crystal molecules in the liquid crystal layer is less than or equal to 10 degrees; dispersion characteristics of the liquid crystal layer and the compensation layer are the opposite of each other.

9 Claims, 7 Drawing Sheets

(51) Int. Cl.
*G02F 1/1337* (2006.01)
*G02F 1/1362* (2006.01)

(52) U.S. Cl.
CPC ...... *G02F 1/133514* (2013.01); *G02F 1/1362* (2013.01); *G02F 2413/02* (2013.01); *G02F 2413/08* (2013.01); *G02F 2413/13* (2013.01)

(56) References Cited

U.S. PATENT DOCUMENTS

| | | | |
|---|---|---|---|
| 2006/0098145 A1 | 5/2006 | Kim et al. | |
| 2006/0132686 A1 | 6/2006 | Jeon et al. | |
| 2009/0168001 A1* | 7/2009 | Ichihashi | G02F 1/13363 349/119 |
| 2010/0134910 A1 | 6/2010 | Chae et al. | |
| 2015/0062499 A1 | 3/2015 | Lee et al. | |
| 2015/0131032 A1 | 5/2015 | Kim et al. | |
| 2015/0153497 A1 | 6/2015 | Chang et al. | |
| 2015/0277010 A1 | 10/2015 | Aimatsu et al. | |
| 2018/0072882 A1 | 3/2018 | Zheng et al. | |
| 2018/0095211 A1 | 4/2018 | Lee et al. | |
| 2018/0224685 A1 | 8/2018 | Shao et al. | |
| 2020/0183212 A1 | 6/2020 | Jia et al. | |
| 2020/0371399 A1 | 11/2020 | Liu et al. | |
| 2021/0132450 A1 | 5/2021 | Sakai et al. | |
| 2022/0050338 A1* | 2/2022 | Wang | G02F 1/133707 |

FOREIGN PATENT DOCUMENTS

| | | | | |
|---|---|---|---|---|
| CN | 1791832 A | | 6/2006 | |
| CN | 101331426 A | | 12/2008 | |
| CN | 101617249 A | | 12/2009 | |
| CN | 104040414 A | | 9/2014 | |
| CN | 104737044 A | | 6/2015 | |
| CN | 105190379 A | | 12/2015 | |
| CN | 106019720 A | | 10/2016 | |
| CN | 107884863 A | | 4/2018 | |
| CN | 108303830 A | | 7/2018 | |
| CN | 108761925 A | * | 11/2018 | ......... G02F 1/13363 |
| CN | 108761925 A | | 11/2018 | |
| CN | 109445193 A | | 3/2019 | |
| CN | 109642968 A | | 4/2019 | |
| CN | 110832391 A | | 2/2020 | |
| CN | 110945414 A | | 3/2020 | |
| CN | 211014954 U | * | 7/2020 | |
| KR | 20080000811 | * | 1/2008 | |
| KR | 1020080000811 A | | 1/2008 | |
| WO | 2021092924 A1 | | 5/2021 | |

OTHER PUBLICATIONS

Office Action dated Apr. 12, 2022 for Chinese Patent Application No. 202010420617.4 and English Translation.

* cited by examiner

Liquid Crystal A

Liquid Crystal B

DISPLAY PANEL AND METHOD FOR PREPARING SAME, AND DISPLAY APPARATUS

CROSS-REFERENCE TO RELATED APPLICATION

This application is a national stage application of PCT Application No. PCT/CN2021/090021, which is filed on Apr. 26, 2021 and claims priority of Chinese Patent Application No. 202010420617.4, filed to the CNIPA on May 18, 2020 and entitled "Display Panel and Method for Preparing Same, and Display Apparatus", the contents of which should be interpreted as being hereby incorporated by reference.

TECHNICAL FIELD

Embodiments of the present disclosure relate to, but are not limited to, the field of display technologies, and particularly relates to a display panel, a preparation method thereof, and a display apparatus.

BACKGROUND

Liquid Crystal Display (LCD) has advantages such as small size, low power consumption and no radiation, and has developed rapidly in recent years. The main structure of LCD includes a Thin Film Transistor (TFT) array substrate and a Color Filter (CF) substrate, and the Liquid Crystal (LC) molecules are filled between the array substrate and the color filter substrate. By controlling the common electrode and the pixel electrode, an electric field is formed to drive the liquid crystal to deflect, and gray tone display is realized. According to display modes, LCD can be divided into Twisted Nematic (TN) display mode, Vertical Alignment (VA) display mode, In Plane Switching (IPS) display mode and Advanced Super Dimension Switch (ADS) display mode, etc. Among them, ADS and IPS are horizontal electric field display apparatus, which have the advantages of wide viewing angle, high aperture ratio, high penetration rate, high display resolution, fast response speed, low power consumption, low chromatic aberration and so on.

Nowadays, horizontal electric field display apparatus have problems such as dark-state light leakage, color cast and empurple, which not only affect the product quality, but affect the application of ADS display mode in curved products.

SUMMARY

Following is a summary about the subject matter described in the present disclosure in detail. The summary is not intended to limit the scope of protection of the claims.

An embodiment of the present disclosure provides a display panel, which includes: an array substrate and an opposite substrate, which are oppositely arranged, and a liquid crystal layer, which is arranged between the array substrate and the opposite substrate, wherein a compensation layer is arranged on the array substrate or the opposite substrate, and an included angle between an optical axis direction of the compensation layer and an initial optical axis direction of liquid crystal molecules in the liquid crystal layer is less than or equal to 10 degrees; dispersion characteristics of the liquid crystal layer and the compensation layer are the opposite of each other, and the compensation layer is configured in such a way that the sum of a phase retardation of light passing through the compensation layer and a phase retardation of light passing through the liquid crystal layer is an integral multiple of a light wavelength.

Optionally, the compensation layer is arranged on a side of the opposite substrate facing the array substrate, or the compensation layer is arranged on a side of the array substrate facing the opposite substrate.

Optionally, the liquid crystal layer has positive dispersion characteristics and the compensation layer has negative dispersion characteristics; or, the liquid crystal layer has negative dispersion characteristics and the compensation layer has positive dispersion characteristics.

Optionally, the compensation layer with positive dispersion characteristics includes a positive double zigzag uniaxial plate with positive dispersion characteristics, and the compensation layer with negative dispersion characteristics includes a positive double zigzag uniaxial plate with negative dispersion characteristics.

Optionally, the positive double zigzag uniaxial plate with positive dispersion characteristics includes: 20% to 45% by weight of liquid crystal, 5% to 35% by weight of liquid crystal polymerized monomer, 0.05% to 19.5% by weight of polymerized monomer and 0.05% to 0.5% by weight of initiator; and the positive double zigzag uniaxial plate with negative dispersion characteristics includes: 15% to 41% by weight of liquid crystal, 5% to 31% by weight of liquid crystal polymerized monomer, 0.05 to 15.5% by weight of polymerized monomer, 0.05 to 0.5% by weight of initiator and 1.0 to 12% by weight of additive.

Optionally, the array substrate includes an array base substrate, an array structure layer arranged on a side of the array substrate facing the opposite substrate, and a first alignment layer arranged on a side of the array structure layer facing the opposite substrate; the opposite substrate includes an opposite base substrate, an opposite structure layer arranged on a side of the opposite substrate facing the array substrate, and a second alignment layer arranged on a side of the opposite structure layer facing the array substrate; the first alignment layer is configured to make a liquid crystal near the first alignment layer in the liquid crystal layer have a first initial posture, and the second alignment layer is configured to make a liquid crystal near the second alignment layer have a second initial posture; and the first initial posture and the second initial posture are mirror symmetric with respect to a central horizontal plane of the liquid crystal layer.

Optionally, the opposite structure layer includes a color filter layer arranged on a side of the opposite base substrate facing the array substrate and a compensation layer arranged on a side of the color filter layer facing the array substrate; or, the opposite structure layer includes a compensation layer arranged on a side of the opposite base substrate facing the array substrate and a color filter layer arranged on a side of the compensation layer facing the array substrate.

Optionally, the opposite substrate further includes a third alignment layer, which is arranged on a side of the compensation layer facing the opposite base substrate, and is configured to make the liquid crystal in the compensation layer have the same posture as the second initial posture.

An embodiment of the present disclosure further provides a display apparatus, including a display panel described above.

An embodiment of the present disclosure further provides a method for preparing a display panel, including:
respectively preparing an array substrate and an opposite substrate, wherein a compensation layer are formed on the array substrate or the opposite substrate;

forming a liquid crystal layer between the array substrate and the opposite substrate; wherein an included angle between an optical axis direction of the compensation layer and an initial optical axis direction of the liquid crystal molecules in the liquid crystal layer is less than or equal to 10 degrees, dispersion characteristics of the liquid crystal layer and the compensation layer are the opposite of each other, and the compensation layer is configured in such a way that the sum of a phase retardation of light passing through the compensation layer and a phase retardation of light passing through the liquid crystal layer is an integral multiple of a light wavelength.

Optionally, the liquid crystal layer has positive dispersion characteristics and the compensation layer has negative dispersion characteristics; or, the liquid crystal layer has negative dispersion characteristics and the compensation layer has positive dispersion characteristics.

Optionally, the compensation layer with positive dispersion characteristics includes a positive double zigzag uniaxial plate with positive dispersion characteristics, and the compensation layer with negative dispersion characteristics includes a positive double zigzag uniaxial plate with negative dispersion characteristics.

Optionally, preparing the array substrate includes: forming an array structure layer on the array base substrate, and forming a first alignment layer on the array structure layer;

preparing the opposite substrate, includes: forming an opposite structure layer on the opposite base substrate, forming a compensation layer on the opposite structure layer, and forming a second alignment layer on the compensation layer; or, forming a compensation layer on the opposite base substrate, forming an opposite structure layer on the compensation layer, and forming a second alignment layer on the opposite structure layer;

the first alignment layer is configured to make the liquid crystal near the first alignment layer in the liquid crystal layer have a first initial posture, and the second alignment layer is configured to make the liquid crystal near the second alignment layer have a second initial posture; and the first alignment layer and the second alignment layer have a same rubbing direction, making the first initial posture and the second initial posture mirror symmetric with respect to the central horizontal plane of the liquid crystal layer.

Optionally, forming the compensation layer includes:

forming a third alignment layer on the opposite base substrate or the opposite structure layer, and forming a compensation layer on the third alignment layer; and the third alignment layer and the second alignment layer having a same rubbing direction, making a liquid crystal in the compensation layer having the same posture as the second initial posture.

After reading and understanding the drawings and the detailed description, other aspects may be understood.

BRIEF DESCRIPTION OF DRAWINGS

The drawings are used to provide an understanding of technical solutions of the present disclosure, form a part of the description, and are used to explain, together with the embodiments of the present disclosure, the technical solutions of the present disclosure and are not intended to form limitations on the technical solutions of the present disclosure. The shape and size of the components in the drawings do not reflect the actual scale, and the purpose thereof is only to describe the contents of the present disclosure.

DETAILED DESCRIPTION

Figure 1:
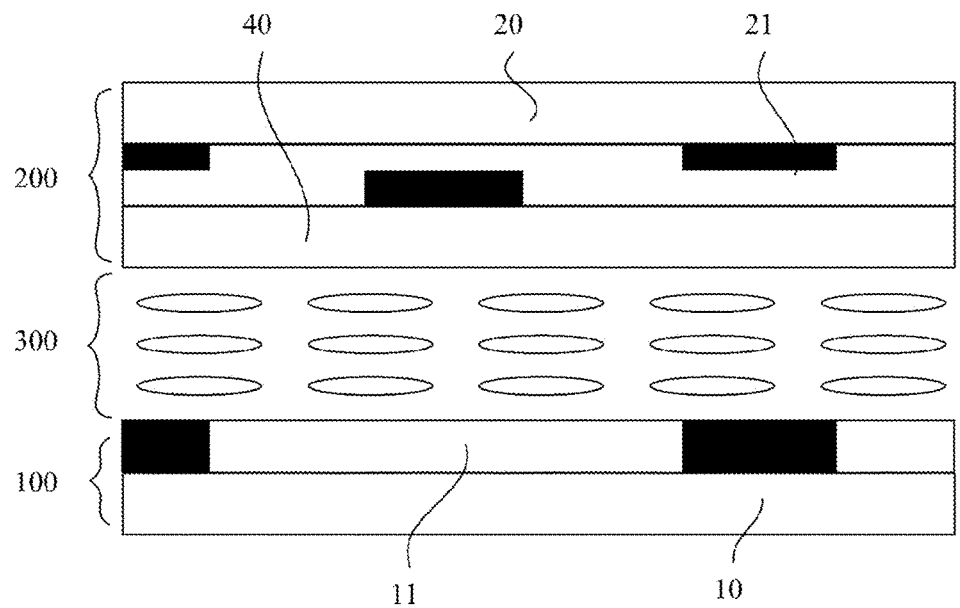
FIG. 1 is a schematic diagram of a structure of a display panel according to an embodiment of the present disclosure.

The embodiments of the present disclosure will be described below in combination with the drawings in detail. The implementation modes may be implemented in various forms. Those of ordinary skills in the art will readily understand the fact that implementations and contents may be transformed into a variety of forms without departing from the spirit and scope of the present disclosure. Therefore, the present disclosure should not be explained as being limited to the contents recorded in the following implementations only. The embodiments in the present disclosure and the features in the embodiments can be freely combined without conflicts.

In the drawings, a size of a constituent element, or a thickness of a layer or an area, is sometimes exaggerated for clarity. Therefore, implementations of the present disclosure are not necessarily limited to the sizes, and the shapes and magnitudes of the components in the drawings do not reflect true proportions. In addition, the drawings schematically show ideal examples, and implementations of the present disclosure are not limited to the shapes or values shown in the drawings.

"First", "second", "third" and other ordinal numerals in the description are set to avoid the confusion of the constituent elements, rather than to limit the quantity.

For convenience, in the description the terms such as "middle", "up", "down", "front", "back", "vertical", "horizontal", "top", "bottom", "inside" and "outside" indicating the orientation or position relationship are used to describe the position relationship between the constituent elements with reference to the drawings, only for the convenience of describing the description and simplifying the description, instead of indicating or implying that the device or element referred to must have a specific orientation or be constructed and operated in a specific orientation, so they should not be understood as limitations to the present disclosure. The positional relationships between the composition elements may be changed as appropriate according to the direction where the composition elements are described. Therefore, appropriate replacements based on situations are allowed, not limited to the expressions in the description.

Unless otherwise specified and limited, in the description the terms "mount", "connected" and "connect" should be understood in a broad sense. For example, it may be fixed connection, removable connection, or integrated connection; it may be mechanical connection or electrical connection; it may be direct connection, indirect connection through an intermediate component, or communication inside two components. For those skilled in the art, the meanings of the above terms in the present disclosure may be understood according to the situation.

In the description, a transistor refers to a component which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. In this description, the channel region refers to a region which the current mainly flows through.

In this specification, it may be the case that a first electrode is a drain electrode and a second electrode is a source electrode, and it may also be the case that a first electrode is a source electrode and a second electrode is a drain electrode. In cases that transistors with opposite polarities are used, or a current direction changes during work of a circuit, or the like, functions of the "source electrode" and the "drain electrode" may sometimes be exchanged. Therefore, the "source electrode" and the "drain electrode" may be exchanged in the present description.

In this description, an "electrical connection" includes a case where constituent elements are connected together through an element with a certain electric action. "The element with the certain electric action" is not particularly limited as long as electric signals between the connected composition elements may be sent and received. Examples of the "element with a certain electric action" may include not only electrodes and wirings, but also switching elements such as transistors, resistors, inductors, capacitors, or elements having other functions.

In this description, "parallel" may refer to a state in which two straight lines form an angle between −10 degrees and 10 degrees and for example, includes a state in which the angle is between −5 degrees and 5 degrees. In addition, "perpendicular" may refer to a state that an angle formed by two straight lines is larger than 80 degrees and smaller than 100 degrees, and for example may include a state that the angle is larger than 85 degrees and smaller than 95 degrees.

In this description, "film" and "layer" may be interchangeable. For example, sometimes "conducting layer" may be replaced by "conducting film". Similarly, sometimes "insulating film" may be replaced by "insulating layer".

At present, a horizontal electric field display panel tends to have serious problems such as dark-state light leakage, empurple and color cast when being bent or pressed. Taking the LCD of ADS display mode as an example, the display panel includes an array substrate, an opposite substrate and a liquid crystal layer between the array substrate and the opposite substrate, and the liquid crystal molecules in the liquid crystal layer have an initial optical axis in the horizontal direction. In order to ensure regular display, the outer sides of the array substrate and the opposite substrate are respectively provided with a first polarizer and a second polarizer with mutually perpendicular light transmission axes. Since the liquid crystal cannot emit light, the display panel is further provided with a backlight source, and the light emitted by the backlight source passes through the first polarizer, the array substrate, the liquid crystal layer, the opposite substrate and the second polarizer in turn. In the case that no voltage is applied, the liquid crystal does not distort the light. If the polarization direction of the light after passing through the first polarizer and the liquid crystal is perpendicular to the light transmission axis direction of the second polarizer, the light cannot be transmitted, and a dark picture is thereby displayed and the display panel is in a dark-state. In the case that voltage is applied, the liquid crystal molecules spin to twist the light, changing the polarization direction of the light, so that the light can be emitted through the second polarizer, and a bright picture is thereby displayed and the display panel is in a bright state. The array substrate and the base substrate of the opposite substrate are often made of glass, which has birefringence effect on light. When the display panel is stressed by bending or pressing, the glass changes from isotropic medium to optically anisotropic medium and will produce uneven stress birefringence according to different stress conditions, and the polarization state of light passing through the glass will change. Generally, the polarization state generated by the base substrate of the array substrate is equal in phase and opposite in direction to the polarization state generated by the base substrate of the opposite substrate. Without the liquid crystal layer, the polarization states generated by the two substrate substrates can be offset. However, due to the existence of the liquid crystal layer, the phase difference is amplified by the liquid crystal, which causes the polarization states generated by the two substrate substrates to be unable to offset each other, resulting in dark-state (L0) light leakage, empurple and color cast problems.

An embodiment of the present disclosure provides a display panel. A display panel provided by an embodiment of the present disclosure may include: an array substrate and an opposite substrate, which are oppositely arranged, and a liquid crystal layer, which is arranged between the array substrate and the opposite substrate, wherein a compensation layer is arranged on the array substrate or the opposite substrate, and an included angle between an optical axis direction of the compensation layer and an initial optical axis direction of liquid crystal molecules in the liquid crystal layer is less than or equal to 10 degrees; dispersion characteristics of the liquid crystal layer and the compensation layer are the opposite of each other, and the compensation layer is configured in such a way that the sum of a phase retardation of light passing through the compensation layer and a phase retardation of light passing through the liquid crystal layer is an integral multiple of a light wavelength.

In an exemplary embodiment, the compensation layer may be arranged on a side of the opposite substrate facing the array substrate, or the compensation layer may be arranged on a side of the array substrate facing the opposite substrate.

In an exemplary embodiment, the liquid crystal layer has positive dispersion characteristics and the compensation layer has negative dispersion characteristics. Alternatively, the liquid crystal layer has negative dispersion characteristics and the compensation layer has positive dispersion characteristics.

In an exemplary embodiment, the compensation layer with positive dispersion characteristics may include a positive double zigzag uniaxial plate (+A plate) with positive dispersion characteristics, and the compensation layer with negative dispersion characteristics may include a positive double zigzag uniaxial plate with negative dispersion characteristics.

In an exemplary embodiment, the array substrate or the opposite substrate may also be provided with a color filter layer. The color filter layer may include a red (R) color filter unit, a green (G) color filter unit and a blue (B) color filter unit arranged periodically, or the color filter layer may include a red color filter unit, a green color filter unit, a blue color filter unit and a white (W) color filter unit arranged periodically.

In an exemplary embodiment, the display panel may be a horizontal electric field type display panel. For example, the display mode of the display panel may be ADS display mode or IPS display mode.

In an exemplary embodiment, the sum of the phase retardation of the light passing through the compensation layer and the phase retardation of the light passing through the liquid crystal layer may not be strictly in accordance with the integral multiple of the incident light, and there can be a certain tolerance range, for example, within 20%, all of which are within the protection range of this disclosure.

The display panel of the embodiment of the present disclosure may be implemented in various ways, and the technical solution of which will be explained in detail by the exemplary embodiments below.

FIG. 1 is a schematic diagram of a structure of a display panel according to an embodiment of the present disclosure. In FIG. 1, a structure in which a compensation layer is arranged on a side of an opposite substrate is illustrated. As shown in FIG. 1, the display panel may include an array substrate 100 and an opposite substrate 200, which are oppositely arranged, and a liquid crystal layer 300 which is arranged between the array substrate 100 and the opposite substrate 200. The array substrate 100 may include an array base substrate 10 and an array structure layer 11 arranged on a surface of the array base substrate 10 facing the opposite substrate 200. The opposite substrate 200 may include a opposite base substrate 20, an opposite structure layer 21 arranged on a surface of the opposite base substrate 20 facing the array substrate 100, and a compensation layer 40 arranged on a surface of the opposite structure layer 21 facing the array substrate 100, wherein, the compensation layer 40 and the liquid crystal layer 300 have opposite dispersion characteristics, and the compensation layer 40 is configured to phase compensate the light passing through the compensation layer 40 so that the sum of the phase retardation of the light passing through the compensation layer 40 and the phase retardation of the light passing through the liquid crystal layer 300 is an integral multiple of the wavelength of the incident light. The display panel may further include an array polarizer, an opposite polarizer, and a backlight source (not shown), wherein the array polarizer is arranged on a surface of the array substrate 100 away from the opposite substrate 200, the opposite polarizer is arranged on a surface of the opposite substrate 200 away from the array substrate 100, the light transmission axis of the array polarizer and the light transmission axis of the opposite polarizer are perpendicular to each other, and the backlight is arranged on the side of the array polarizer away from the array substrate 100. The light emitted from the backlight source sequentially passes through the array polarizer, the array base substrate 10, the array structure layer 11, the liquid crystal layer 300, the compensation layer 40, the opposite structure layer 21, the opposite base substrate 20 and the opposite polarizer, and the initial optical axis direction of liquid crystal molecules in the liquid crystal layer 300 is horizontal. In an exemplary embodiment, the main structure of the array structure layer may include a thin film transistor, a pixel electrode and a common electrode, and the main structure of the opposite structure layer may include a black matrix and a color filter layer.

Light travels slowly in substances with high refractive index and faster in substances with low refractive index. Because liquid crystal has optical birefringence, the refractive index of liquid crystal includes regular (ordinary light) refractive index nO and irregular (extraordinary light) refractive index ne respectively. When light passes through the liquid crystal layer with refractive index difference in XY direction, the traveling distance of light in XY direction will be different, and this difference value is Phase Retardation, or phase difference. Herein, X refers to the X-axis direction in the liquid crystal plane, and Y refers to the Y-axis direction perpendicular to the X-axis in the liquid crystal plane. According to the phase retardation calculation formula, the in-plane phase retardation RLC of the liquid crystal layer $300=(ne-n0)*d2$; wherein, d2 is a thickness of the liquid crystal layer 300 perpendicular to the direction of the display panel, n0 is a regular refractive index of the liquid crystal, and ne is an irregular refractive index of the liquid crystal.

In an exemplary embodiment, the compensation layer 40 can be a positive double zigzag uniaxial (+A) plate, also known as +A compensation film layer, which satisfies $nx>ny=nz$; wherein, nx is the refractive index in the X-axis direction in the +A plate, ny is the refractive index in the Y-axis direction perpendicular to the X-axis in the +A plate, and nz is the refractive index in the thickness direction of the +A plate. According to the phase retardation calculation formula, the in-plane phase retardation of the compensation layer 40 is expressed as $R+A=(nx-ny)*d1$, where d1 is a thickness of the compensation layer 40 perpendicular to the direction of the display panel. In this way, the sum of the phase retardation of the incident light passing through the +A plate and the phase retardation of the incident light passing through the liquid crystal layer is an integral multiple of the wavelength of the incident light, which can be expressed as: R+A+RLC=m*λ, m=0, 1, 2 . . . , where λ is the wavelength of the incident light. By adjusting the material characteristics (nx or ny) or thickness parameter (d1) of the +A plate to satisfy (nx−ny)*d1=m*λ−(ne−n0)*d2, the +A plate can compensate the in-plane phase retardation generated by light passing through the liquid crystal layer when the included angle between the optical axis direction of the +A plate and the initial optical axis direction of liquid crystal molecules in the liquid crystal layer is less than or equal to 10 degrees. In some possible implementations, the +A board may use liquid crystal composite material to reduce the manufacturing cost.

Dispersion is the property that the refractive index of a material changes with the wavelength of incident light. Dispersion is categorized into positive dispersion (also known as normal dispersion) and negative dispersion (also known as irregular dispersion). Wherein, positive dispersion means that the refractive index of the medium decreases with the increase of light wavelength, whereas negative dispersion means that the refractive index of the medium increases with the increase of light wavelength. In the embodiment of the present disclosure, for the liquid crystal with optical birefringence, the liquid crystal with positive dispersion characteristics means that the birefringence Δn decreases as the light wavelength increases, that is |Δn(450)|>|Δn(550)|, or Δn (450)/Δn (550)>1; the liquid crystal with negative dispersion characteristics means that the birefringence (Δn) increases with the increase of light wavelength, that is |Δn(450)|<|Δn(550)|, or Δn(450)/Δn(550)<1. In which, Δn (450) represents the birefringence of the liquid crystal material under the light with a wavelength of 450 nm, Δn (550) represents the birefringence of the liquid crystal material under the light with a wavelength of 550 nm, and the birefringence Δn=ne−n0.

Since the in-plane phase retardation RLC of the liquid crystal layer 300 is represented as RLC=ΔnLC*d2, for liquid crystals with positive dispersion characteristics, the in-plane phase retardation RLC decreases with the increase of light wavelength, that is, the short wavelength RLC(450)>the long wavelength RLC (550); and for liquid crystals with negative dispersion characteristics, the in-plane phase retardation RLC increases with the increase of light wavelength, that is, short wavelength RLC(450)<long wavelength RLC(550). Herein, RLC(450) represents the in-plane phase retardation of light with a wavelength of 450 nm passing through the liquid crystal layer, and RLC(550) represents the in-plane phase retardation of light with a wavelength of 550 nm passing through the liquid crystal layer.

Because the in-plane phase retardation of +A plate is represented as R+A=Δn+a*d1, the in-plane phase retardation R+A of +A plate with positive dispersion characteristics decreases with the increase of light wavelength, that is, short wavelength R+A(450)>long wavelength R+A(550). The in-plane phase retardation R+A of +A plate with negative dispersion characteristics increases with the increase of light wavelength, that is, short wavelength R+A(450)<long wavelength R+A(550). Herein, R+A(450) represents the in-plane phase retardation of light with a wavelength of 450 nm passing through the +A plate, and R+A(550) represents the in-plane phase retardation of light with a wavelength of 550 nm passing through the +A plate.

In an exemplary embodiment, the compensation layer 40 uses a +A plate with negative dispersion characteristics, and the liquid crystal layer uses liquid crystal with positive dispersion characteristics. As the light wavelength increases, the in-plane phase retardation RLC of light passing through the liquid crystal layer with positive dispersion characteristics decreases, while the in-plane phase retardation R+A of light passing through the +A plate with negative dispersion characteristics increases. Therefore, as the light wavelength increases, the gradually increasing phase retardation R+A and the gradually decreasing phase retardation RLC cancel each other out, reducing the amount of change of the sum of the phase retardation of the light passing through the compensation layer and the phase retardation of the light passing through the liquid crystal layer RLC+R+A, ensuring the phase compensation effect of the +A plate, so that the light in a larger wavelength range can obtain phase compensation.

In an exemplary embodiment, the compensation layer 40 uses a +A plate with positive dispersion characteristics, and the liquid crystal layer 300 uses liquid crystal with negative dispersion characteristics. As the light wavelength increases, the in-plane phase retardation RLC of light passing through the liquid crystal layer with negative dispersion characteristics increases, while the in-plane phase retardation R+A of light passing through the +A plate with positive dispersion characteristics decreases. Therefore, as the light wavelength increases, the gradually decreasing phase retardation R+A and the gradually increasing phase retardation RLC cancel each other out, reducing the amount of change of the sum of the phase retardation of the light passing through the compensation layer and the phase retardation of the light passing through the liquid crystal layer RLC+R+A, ensuring the phase compensation effect of the +A plate, so that the light in a larger wavelength range can obtain phase compensation.

In an exemplary embodiment, a compensation layer with positive dispersion characteristics may include a positive double zigzag uniaxial plate (+A plate) with positive dispersion characteristics. In some possible implementations, the birefringence of the +A plate with positive dispersion characteristics may include: the birefringence is 0.15 to 0.16 at the wavelength of 450 nm to 480 nm; the birefringence is 0.13 to 0.14 at the wavelength of 540 nm to 550 nm; and the birefringence is 0.11 to 0.12 at the wavelength of 580 nm to 650 nm. In an exemplary embodiment, a compensation layer with negative dispersion characteristics may include a positive double zigzag uniaxial plate (+A plate) with negative dispersion characteristics. In some possible implementations, the birefringence of the +A plate with negative dispersion characteristics may include: the birefringence is 0.038 to 0.110 at the wavelength of 450 nm to 480 nm; the birefringence is 0.122 to 0.164 at the wavelength of 540 nm to 550 nm; and the birefringence is 0.170 to 0.210 at the wavelength of 580 nm to 650 nm. In an exemplary embodiment, the birefringence of liquid crystal with positive dispersion characteristics and liquid crystal with negative dispersion characteristics may be 0.001 to 0.5.

In an exemplary embodiment, the color filter layer in the opposite structure layer 21 may include a first color filter unit, a second color filter unit and a third color filter unit arranged periodically. The first color filter unit is configured to filter the light passing through the first color filter unit to filter out the light of the first color. The second color filter unit is configured to filter the light passing through the second color filter unit to filter out the second color light. The third color filter unit is configured to filter the light passing through the third color filter unit to filter out the third color light.

In an exemplary embodiment, the integral multiple may be 1, that is, the sum of the phase retardation of the light passing through the compensation layer 40 and the phase retardation of the light passing through the liquid crystal layer is the wavelength of the incident light, which can reduce the thickness of the compensation layer 40 as much as possible, and is conducive to the thinning of the display panel. In some possible implementations, the thickness of the compensation layer 40 may be 0.8 μm to 2.5 μm.

In an exemplary embodiment, the light wavelength may be in the visible light wavelength range; alternatively, the light wavelength can be a monochromatic light wavelength commonly used in display panels, such as red light wavelength (605 nm to 700 nm), green light wavelength (505 nm to 600 nm) or blue light wavelength (400 nm to 500 nm), etc. Alternatively, the wavelength of the light may be a standard wavelength, such as 550 nm. In an exemplary embodiment, the phase retardation of light passing through the compensation layer 40 can be configured to 100 nm to 300 nm, which is not limited here.

It can be seen from the structure of the display panel of the embodiment of the disclosure that, by setting the dispersion characteristics of the liquid crystal layer and the compensation layer to be opposite, the change of the sum of the phase retardation of light passing through the compensation layer and the phase retardation of light passing through the liquid crystal layer is relatively small as the light wavelength increases, thus ensuring the phase compensation effect of the compensation layer, and enabling all light rays in a larger wavelength range to obtain phase compensation. When the polarization state of the transmitted light changes due to the uneven external force on the display panel, the phase retardation of the compensation layer and the phase retardation of the liquid crystal layer can be matched with each other in a larger wavelength range, thus compensating the phase retardation of the light passing through the liquid crystal layer, so that the light can be restored to the original polarization state. And in the dark-state, the light cannot be emitted from the horizontally oriented display panel, which not only effectively improves the dark-state light leakage and empurple, but also effectively improves the color cast.

In some technologies, there are schemes of providing a compensation layer between the array substrate and the opposite substrate. Although those schemes can improve the dark-state light leakage to a certain extent, they cannot solve the problems of dark-state color cast and dark-state empurple. Some technical solutions only reduce the overall light leakage in a small wavelength range, but without considering the dispersion characteristics of the liquid crystal layer and the compensation layer can affect the light leakage and color cast, the liquid crystal layer and the compensation layer are made of materials with the same dispersion characteristics. Therefore, with the increase (or decreases) of the light wavelength, the phase retardation of the compensation layer and the phase retardation of the liquid crystal layer overlap each other, which increases the variation of the sum of the phase retardation of light passing through the compensation layer and the phase retardation of light passing through the liquid crystal layer, and further reduces the phase compensation effect of the compensation layer. In fact, some technical schemes only reduce the overall light leakage in a small wavelength range, but because there are still light leakage in other larger wavelength ranges, those technical schemes actually aggravate the dark-state color cast and dark-state empurple problems while improving the dark-state light leakage. In contrast, in the present embodiments, setting the dispersion characteristics of the liquid crystal layer and the compensation layer to be opposite can not only reduce the overall light leakage but also improve the dark-state light leakage problem. Besides, as the light wavelength increases (or decreases), the phase retardation of the compensation layer and the phase retardation of the liquid crystal layer cancel each other out, which reduces the variation of the sum of the phase retardation of light passing through the compensation layer and the phase retardation of light passing through the liquid crystal layer, and improves the phase compensation effect of the compensation layer. The light with a larger wavelength range can be restored to the original polarization state, and the light leakage amount reduced in the larger wavelength range is equal, thus realizing the color cast compensation in the larger wavelength range, effectively improving the color cast and empurple problems, thus achieves no dispersion and improves the L0 picture quality. The scheme of this embodiment breaks the bottleneck that the ADS display mode curved surface is limited, and increases the feasibility of applying ADS display mode to curved surface products.

Figure 2:
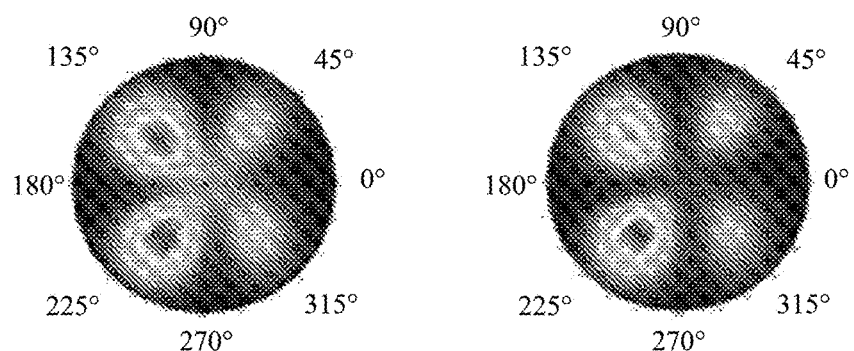
FIG. 2 is a schematic diagram of improving light leakage of a display panel structure according to an embodiment of the present disclosure.

FIG. 2 is a schematic diagram of improving light leakage of a display panel structure according to an embodiment of the present disclosure, in which on the left is the light leakage simulation result when the liquid crystal layer and the compensation layer are both positive dispersion characteristics, and on the right is the light leakage simulation result when the liquid crystal layer is positive dispersion characteristics and the compensation layer is negative dispersion characteristics. As shown in FIG. 2, when both the liquid crystal layer and the compensation layer have positive dispersion characteristics, there is a serious problem with the dark-state light leakage, with the light leakage brightness of 0.00169 at 436 nm, 0.00019 at 550 nm and 0.00088 at 700 nm. When the liquid crystal layer has positive dispersion characteristics and the compensation layer has negative dispersion characteristics, the problem with dark-state light leakage is improved, and the light leakage brightness is lower, which is 0.00039 at 436 nm, 0.00019 at 550 nm and 0.00042 at 700 nm.

Figure 3:
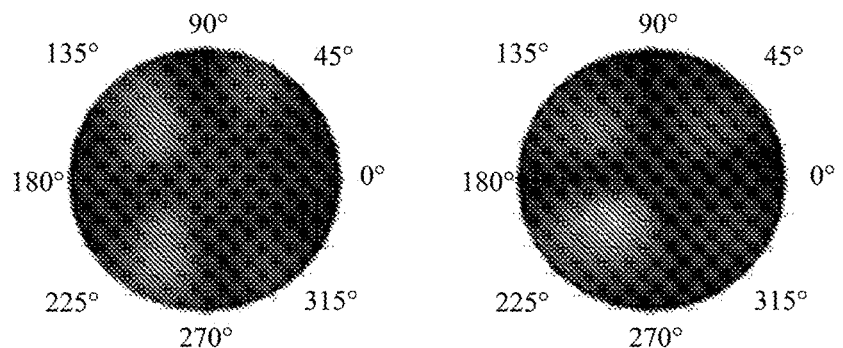
FIG. 3 is a schematic diagram of improving color cast of a display panel structure according to an embodiment of the present disclosure.

FIG. 3 is a schematic diagram of improving color cast of a display panel structure according to an embodiment of the present disclosure, in which on the left is the color cast simulation result when the liquid crystal layer and the compensation layer are both positive dispersion characteristics, and on the right is the color cast simulation result when the liquid crystal layer is positive dispersion characteristics and the compensation layer is negative dispersion characteristics. As shown in FIG. 3, when both the liquid crystal layer and the compensation layer have positive dispersion characteristics, there is a serious problem with color cast. When the liquid crystal layer has positive dispersion characteristics and the compensation layer has negative dispersion characteristics, the problem with color cast is improved and the color uniformity is made better.

Figure 4:
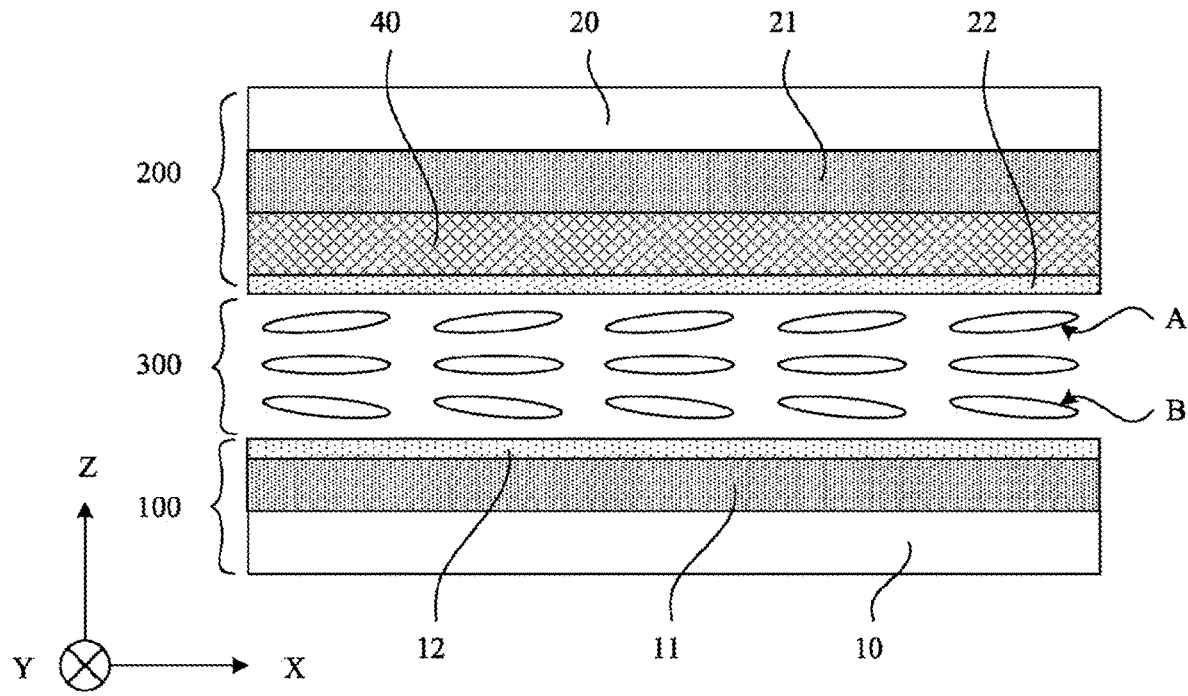
FIG. 4 is a schematic diagram of another structure of a display panel according to an embodiment of the present disclosure.

FIG. 4 is a schematic diagram of another structure of a display panel according to an embodiment of the present disclosure. In FIG. 4, a structure in which a compensation layer is arranged on a side of an opposite substrate is illustrated. In FIG. 4, the X-axis represents the long side (or short side) direction of the display panel, the Z-axis represents the thickness direction of the display panel, and the Y-axis represents the short side (or long side) direction of the display panel perpendicular to the paper pointing inwards. As shown in FIG. 4, the display panel may include an array substrate 100 and an opposite substrate 200 that are disposed opposite to each other, and a liquid crystal layer 300 provided between the array substrate 100 and the opposite substrate 200. The array substrate 100 may include an array base substrate 10, an array structure layer 11 arranged on the surface of the array base substrate 10 facing the opposite substrate 200, and a first alignment layer 12 arranged on the surface of the array structure layer 11 facing the opposite substrate 200. The opposite substrate 200 may include an opposite base substrate 20, an opposite structure layer 21 arranged on the surface of the opposite base substrate 20 facing the array substrate 100, a compensation layer 40 arranged on the surface of the opposing structure layer 21 facing the array substrate 100, and a second alignment layer 22 arranged on the surface of the compensation layer 40 facing the array substrate 100. Among them, the first alignment layer 12 arranged on a side of the liquid crystal layer 300 is configured to make the liquid crystal in the liquid crystal layer 300 near the first alignment layer 12 have a first initial posture, the second alignment layer 22 arranged on the other side of the liquid crystal layer 300 is configured to make the liquid crystal in the liquid crystal layer 300 near the second alignment layer 22 have a second initial posture, and the compensation layer 40 is configured to phase compensate the light passing through the compensation layer 40 so that the sum of the phase retardation of the light passing through the compensation layer 40 and the phase retardation of the light passing through the liquid crystal layer 300 is an integral multiple of the wavelength of the incident light. In an exemplary embodiment, the display panel may further include an array polarizer, an opposite polarizer, and a backlight source (not shown), wherein the array polarizer is arranged on a surface of the array substrate 100 away from the opposite substrate 200, the opposite polarizer is arranged on a surface of the opposite substrate 200 away from the array substrate 100, the light transmission axis of the array polarizer and the light transmission axis of the opposite polarizer are perpendicular to each other, and the backlight is arranged on the side of the array polarizer away from the array substrate 100. The light emitted from the backlight source sequentially passes through the array polarizer, the array base substrate 10, the array structure layer 11, the first alignment layer 12, the liquid crystal layer 300, the second alignment layer 22, the compensation layer 40, the opposite structure layer 21, the opposite base substrate 20 and the opposite polarizer.

In an exemplary embodiment, the initial optical axis direction of the liquid crystal molecules in the liquid crystal layer 300 may be horizontal, the dispersion characteristics of the compensation layer 40 are opposite to the dispersion characteristics of the liquid crystal layer 300, and the first initial posture of the liquid crystal near the first alignment layer 12 in the liquid crystal layer 300 and the second initial posture of the liquid crystal near the second alignment layer 22 in the liquid crystal layer 300 are mirror symmetric with respect to the central horizontal plane (parallel to the XOY plane) of the liquid crystal layer 300.

In an exemplary embodiment, the initial posture of the liquid crystal may include the pretilt angle of the liquid crystal molecules and the tilt direction of the liquid crystal molecules. The mirror symmetry of the first initial posture and the second initial posture with respect to the central horizontal plane of the liquid crystal layer 300 means that the pretilt angle of the liquid crystal molecules near the first alignment layer 12 in the liquid crystal layer 300 is the same as the pretilt angle of the liquid crystal molecules near the second alignment layer 22 in the liquid crystal layer 300, and the tilt direction of the liquid crystal molecules near the first alignment layer 12 in the liquid crystal layer 300 is opposite to the tilt direction of the liquid crystal molecules near the second alignment layer 22 in the liquid crystal layer 300.

Figure 5:
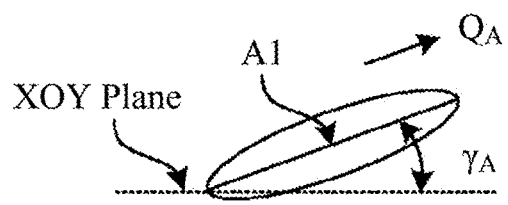
FIG. 5 is a schematic diagram of liquid crystal A in FIG. 4 in a first initial posture.
Figure 6:
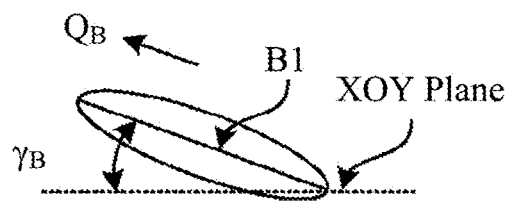
FIG. 6 is a schematic diagram of liquid crystal B in FIG. 4 in a first initial posture.

FIG. 5 is a schematic diagram of liquid crystal A in FIG. 4 in a first initial posture, and FIG. 6 is a schematic diagram of liquid crystal B in FIG. 4 in a second initial posture. As shown in FIG. 5, liquid crystal A is the liquid crystal near the second alignment layer 22 in the liquid crystal layer 300. For the second alignment layer 22 after rubbing treatment, in a initial state without electric power, the liquid crystal A will be aligned in a rubbing direction of the second alignment layer 22. With respect to the surface of the second alignment layer 22 (parallel to the XOY plane), the optical axis A1 of the liquid crystal molecules extends along the XZ direction, with a fixed included angle γA and an tilt direction QA; wherein, the included angle γA is called the pretilt angle of A liquid crystal (second pretilt angle), and QA is called the initial tilt direction of A liquid crystal (second tilt direction). As shown in FIG. 6, liquid crystal B is the liquid crystal near the first alignment layer 12 in the liquid crystal layer 300. For the first alignment layer 12 after rubbing treatment, in a initial state without electric power, the liquid crystal B will be aligned in a rubbing direction of the first alignment layer 12. With respect to the surface of the first alignment layer 12 (parallel to the XOY plane), the optical axis B1 of the liquid crystal molecules extends along the XZ direction, with a fixed included angle γB and an tilt direction QB; wherein, the included angle γB is called the pretilt angle of B liquid crystal (first pretilt angle), and QB is called the initial tilt direction of B liquid crystal (first tilt direction). In an exemplary embodiment, by setting the rubbing direction and rubbing parameters of the first alignment layer 12 and the second alignment layer 22, the pretilt angle γA of the liquid crystal A is equal to the pretilt angle γB of the liquid crystal B, and the initial tilt direction QA of the liquid crystal A is opposite to the initial tilt direction QB direction of the liquid crystal B, the first initial posture of the liquid crystal A and the second initial posture of the liquid crystal B can be mirror symmetric with respect to the central horizontal plane of the liquid crystal layer 300.

Due to the pretilt angle, light passing through the liquid crystal from different directions will have different phase retardations, that is, there are phase retardation differences, which can cause color cast when human eyes watch the display panel from different angles. According to the disclosed embodiments, the first initial posture of the liquid crystal near the first alignment layer and the second initial posture of the liquid crystal near the second alignment layer are configured to be mirror symmetric, that is, the first pretilt angle of the liquid crystal molecules near the first alignment layer is the same as the second pretilt angle of the liquid crystal molecules near the second alignment layer, and the first tilt direction of the liquid crystal molecules near the first alignment layer is opposite to the second tilt direction of the liquid crystal molecules near the second alignment layer. In this way, the phase retardation difference of light passing through the liquid crystal layer from different directions is compensated, so that the phase retardation of the liquid crystal layer is consistent when the human eye views the display panel from different angles, thereby improving the color cast phenomenon.

In an exemplary embodiment, a first pretilt angle and a second pretilt angle may be 0 to 3 degrees. In some possible implementations, the first pretilt angle and the second pretilt angle may be 2 degrees, which will not adversely affect the light transmittance on the premise of improving the color cast.

In an exemplary embodiment, polyimide (PI) can be used for the first alignment layer and the second alignment layer, which has the advantages of good chemical stability, excellent mechanical properties, good insulation, high temperature resistance, radiation resistance and the like. The first alignment layer and the second alignment layer may adopt a Rubbing process or an Optical Alignment (OA) process.

In some possible implementations, the first pretilt angle does not have to be completely equal to the second pretilt angle, and there may be a certain tolerance range, such as within 20%, all of which are within the scope of protection of this disclosure. In some possible implementations, the optical axis of liquid crystal molecules near the first alignment layer can be configured to rotate counterclockwise with respect to the horizontal plane, and the optical axis of liquid crystal molecules near the second alignment layer can be configured to deflect clockwise with respect to the horizontal plane; alternatively, the optical axis of the liquid crystal molecules near the first alignment layer is configured to rotate clockwise with respect to the horizontal plane, and the optical axis of the liquid crystal molecules near the second alignment layer is deflected counterclockwise with respect to the horizontal plane, which is not limited in this embodiment of the present disclosure.

Figure 7:
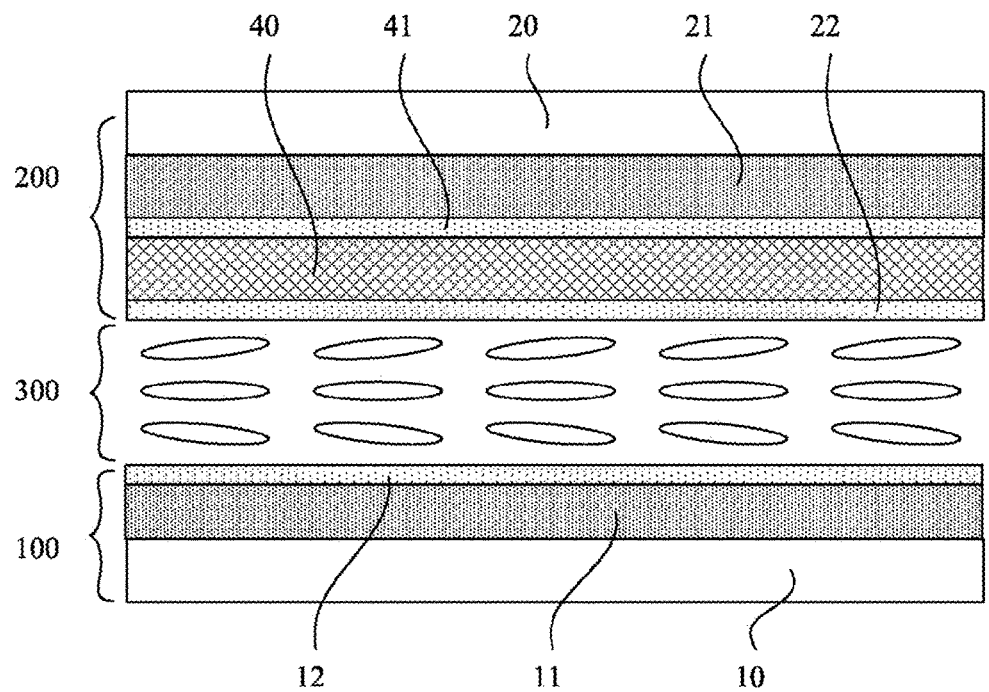
FIG. 7 is a schematic diagram of another structure of a display panel according to an embodiment of the present disclosure.

FIG. 7 is a schematic diagram of another structure of a display panel according to an embodiment of the present disclosure. The display panel may include an array substrate 100 and an opposite substrate 200 that are disposed opposite to each other, and a liquid crystal layer 300 provided between the array substrate 100 and the opposite substrate 200. As shown in FIG. 7, the opposite substrate 200 may further include a third alignment layer 41 disposed between the opposite structure layer 21 and the compensation layer 40; the third alignment layer 41 is arranged on the surface of the opposite structure layer 21 facing the array substrate 100, and the compensation layer 40 is arranged on the surface of the third alignment layer 41 facing the array substrate 100, and the third alignment layer 41 is disposed to make the liquid crystal in the compensation layer 40 have a third initial posture.

In an exemplary embodiment, the third initial posture of the liquid crystal in the compensation layer 40 is the same as the second initial posture of the liquid crystal near the second alignment layer 22 in the liquid crystal layer 300. In an exemplary embodiment, the third initial posture includes a third pretilt angle and a third tilt direction. The third initial posture of the liquid crystal in the compensation layer 40 is the same as the second initial posture of the liquid crystal near the second alignment layer 22 in the liquid crystal layer 300 means that the third pretilt angle of the liquid crystal molecules in the compensation layer 40 is the same as the second pretilt angle of the liquid crystal molecules near the second alignment layer 22 in the liquid crystal layer 300, and the third tilt direction of the liquid crystal molecules in the compensation layer 40 is the same as the tilt direction of the liquid crystal molecules near the second alignment layer 22 in the liquid crystal layer 300.

In an exemplary embodiment, the second alignment layer 22 and the third alignment layer 41 are located on the same side of the liquid crystal layer 300. When the compensation layer 40 adopts the +A plate with positive phase retardation, by configuring the third tilt direction of the liquid crystal molecules in the compensation layer 40 to be the same as the second tilt direction of the adjacent liquid crystal molecules, the liquid crystal molecules in the +A plate and the adjacent liquid crystal molecules can achieve self-compensation viewing angle, which not only compensates the phase retardation difference of the liquid crystal layers in different directions, making the phase retardation of liquid crystals in different directions consistent. The difference of alignment modes of liquid crystal molecules is compensated, the color cast phenomenon is improved, the viewing angle is increased, and the display quality is improved.

The structure of the display panel will now be described through an example of a preparation process of the display panel. The "patterning process" mentioned in the embodiment of the present disclosure may include processes of film layer deposition, photoresist coating, mask exposure, development, etching, and photoresist stripping, etc. Deposition may be any one or more of sputtering, evaporation, and chemical vapor deposition. Coating may be any one or more of spray coating and spin coating. Etching may be any one or more of dry etching and wet etching. "Thin film" refers to a layer of thin film made from a certain material on a substrate by a deposition or coating process. If the patterning process is not needed by the "thin film" in the whole making process, the "thin film" may also be called a "layer". When the patterning process is needed by the "thin film" in the whole making process, the thin film is called a "thin film" before the patterning process and called a "layer" after the patterning process. The "layer" after the patterning process includes at least one "pattern". "A and B are configured on the same layer" in the embodiments of the present disclosure, refers to that A and B are formed simultaneously by a same patterning process.

The manufacturing process of the display panel in this disclosed embodiment mainly includes two parts, the first part includes substrate preparation, and the second part includes alignment pressing (cell alignment). Among them, substrate preparation includes array substrate preparation and opposite substrate preparation, which have no order requirement and can be carried out simultaneously. The following describes the two-part processing acts respectively.

I. Preparation of an Array Substrate in Part I

The array substrate of the embodiment of the present disclosure may include an array base substrate 10, an array structure layer 11 arranged on the array substrate 10, and a first alignment layer 12 arranged on the array structure layer 11. The main structure of the array structure layer 11 may include a thin film transistor, a pixel electrode and a common electrode. The process of forming an array substrate according to the embodiments of the present disclosure can adopt the process in some technical preparation of LCD, which is basically the same as that in some technologies. In an exemplary embodiment, the process of forming the array substrate may include: (1) gate lines, gate electrodes and common electrode patterns are formed on the array base substrate. (2) A gate insulating layer covering the gate line, the gate electrode and the common electrode, and an active layer arranged on the gate insulating layer are formed. (3) A data line, a source electrode and a drain electrode are formed, wherein a conductive channel is formed between the source electrode and the drain electrode. (4) A passivation layer covering the data line, the source electrode and the drain electrode is formed, a via hole exposing the drain electrode is provided on the passivation layer. (5) A pixel electrode is formed on the passivation layer, wherein the pixel electrode is connected to the drain electrode through a via hole on the passivation layer. (6) A planarization layer covering the pixel electrode is formed, a rubbing film is formed on the planarization layer and is rubbed by a friction device to form a first alignment layer 12, wherein regularly disposed grooves are formed on the first alignment layer 12, and the regularly disposed grooves are configured to align the liquid crystal molecules according to the groove direction in the absence of an electric field, thereby achieving the rubbing of the liquid crystal molecules. In an exemplary embodiment, the common electrode is configured to provide a common voltage, and the pixel electrode is configured to provide a pixel voltage for display. One of the common electrode and the pixel electrode is a plate electrode and the other is a slit electrode, and the multi-dimensional electric field generated between the slit electrode and the plate electrode drives the liquid crystal to deflect.

Figure 8:
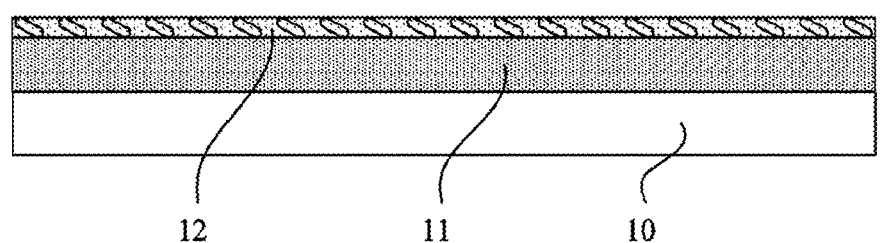
FIG. 8 is a schematic diagram after a pattern of an array substrate is formed according to an embodiment of the present disclosure.

In an exemplary embodiment, a rubbing cloth wrapped on a rubbing roller in a rubbing device rubs the first alignment layer 12 along the first rubbing direction Q1, and the grooves formed on the first alignment layer 12 will align the liquid crystal molecules according to the first initial posture, as shown in FIG. 8. In some possible implementations, the methods for forming the first alignment layer include, but are not limited to, the methods of coating and inkjet, and the preparation process is mature and easy for industrial production.

Figure 9:
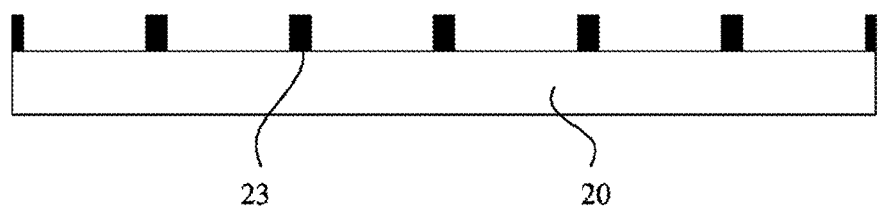
FIG. 9 is a schematic diagram after a pattern of a black matrix is formed according to an embodiment of the present disclosure.

II. Preparation of an Opposite Substrate in Part I (1) A black matrix pattern is prepared, including: a black matrix film is coated on the opposite base substrate 20, the black matrix film is exposed with a mask plate, and black matrix patterns 23 arranged at intervals are formed on the opposite base substrate 20 after development, as shown in FIG. 9.

Figure 10:
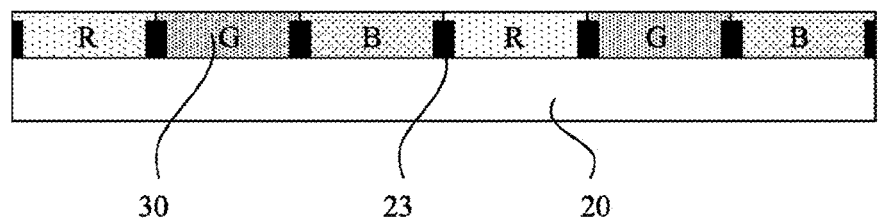
FIG. 10 is a schematic diagram after a pattern of a color filter layer is formed according to an embodiment of the present disclosure.

(2) A color filter layer pattern is prepared, including: a color filter layer 30 pattern is formed on the opposite base substrate 20 on which the black matrix 23 pattern is formed. The color filter layer 30 pattern may include a red film unit, a green film unit and a blue film unit which are respectively arranged between the black matrices 23 and periodically arranged according to a set rule, as shown in FIG. 10. In an exemplary embodiment, the black matrix 23 and the color filter layer 30 together form an opposite structure layer.

Figure 11:
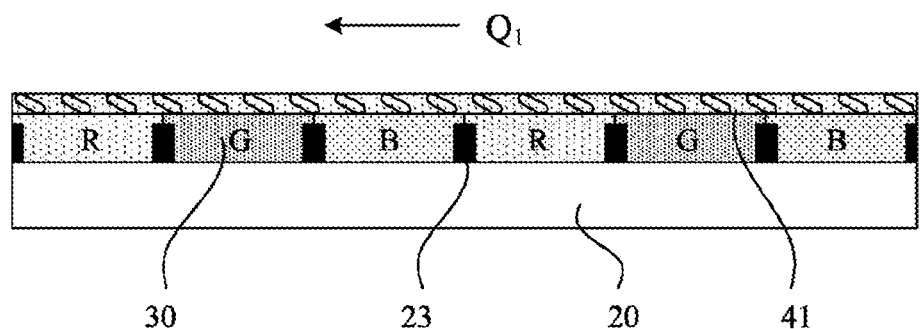
FIG. 11 is a schematic diagram after formation of a pattern of a third alignment layer according to an embodiment of the present disclosure.

(3) A third alignment layer is prepared, including: a rubbing film is coated on the opposite base substrate 20 with the above pattern and is rubbed with a rubbing device to form a third alignment layer 41, as shown in FIG. 11. In an exemplary embodiment, the rubbing device rubs the rubbing film along the first rubbing direction Q1, and grooves are formed on the third alignment layer 41 to align the liquid crystal molecules according to the first initial posture. That is, the rubbing direction of the third alignment layer 41 and the first alignment layer 12 is the same.

Figure 12:
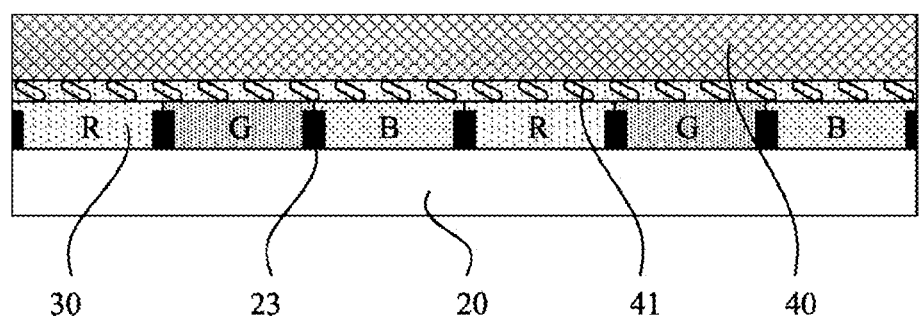
FIG. 12 is a schematic diagram after a pattern of a compensation layer is formed according to an embodiment of the present disclosure.

(4) A compensation layer is prepared, including: a layer of polymer liquid crystal composite film is coated on the third alignment layer 41 and is then heated or irradiated so that the heated or irradiated polymer liquid crystal composite film is polymerized to form the compensation layer 40, as shown in FIG. 12.

In an exemplary embodiment, since the third alignment layer 41 has grooves in the first rubbing direction Q1, when the polymer liquid crystal composite film is coated on the third alignment layer 41, the liquid crystal molecules in the polymer liquid crystal composite film will be aligned in this rubbing direction, and the liquid crystal molecules have a first initial posture with respect to the surface of the third alignment layer 41. After the liquid crystal in the compensation layer 40 is polymerized, the optical axis direction of the liquid crystal molecules will not change, that is, the posture of the subsequent liquid crystal molecules is the same as the first initial posture, which is different from that of the liquid crystal molecules in the liquid crystal layer of the display panel.

In an exemplary embodiment, when the compensation layer 40 has positive dispersion characteristics, the material of the polymer liquid crystal composite film may include liquid crystal, liquid crystal polymerized monomer, polymerized monomer and initiator. In some possible implementations, in the material of polymer liquid crystal composite film, the weight percentage of liquid crystal can be 20% to 45%, the weight percentage of liquid crystal polymerized monomer can be 5% to 35%, the weight percentage of polymerized monomer can be 0.05 to 19.5%, and the weight percentage of initiator can be 0.05% to 0.5%.

When the compensation layer 40 has negative dispersion characteristics, the material of the polymer liquid crystal composite film may include liquid crystal, liquid crystal polymerized monomer, polymerized monomer, additive, initiator and additive. In some possible implementations, in the material of polymer liquid crystal composite film, the weight percentage of liquid crystal can be 15% to 41%, the weight percentage of liquid crystal polymerized monomer can be 5% to 31%, the weight percentage of polymerized monomer can be 0.05 to 15.5%, the weight percentage of initiator can be 0.05% to 0.5%, and the weight percentage of additives can be 1.0% to 12%.

In an exemplary embodiment, the polymerized monomer can be thermal polymerized monomer or ultraviolet polymerized monomer, including but not limited to any one or more of polyethylene glycol diglycidyl ether, bisphenol F epoxy resin, trimethylolpropane triglycidyl ether and quaternary tetraol glycidyl ether. The initiator can be thermal initiator or photoinitiator, including but not limited to any one or more of IRG 651 benzoin and its derivatives, benzil and benzophenone. The additive can be any one or more of boron fluoride bipyrrole fluorescent dyes, ethidium bromide and rhodamine.

In an exemplary embodiment, the liquid crystal can adopt any one or more of the compounds having the following chemical formula:

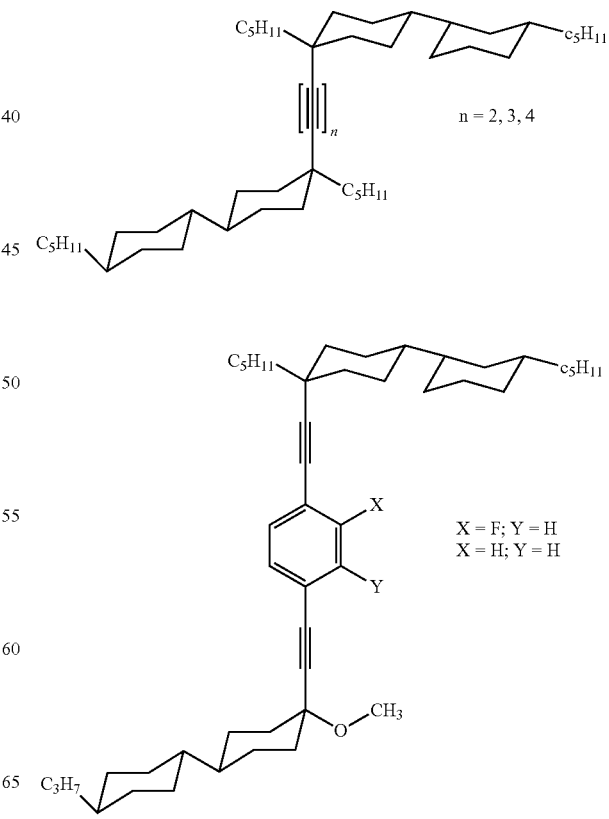

-continued

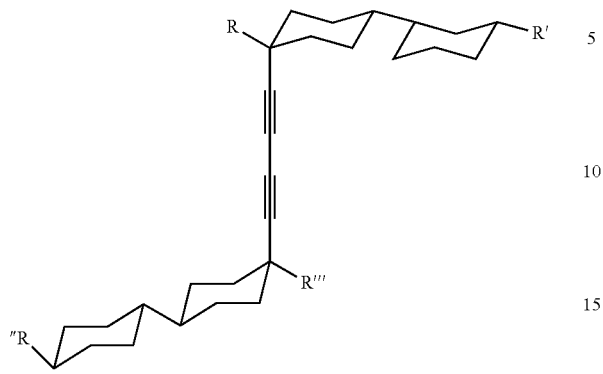

R CH₃O; R' C₅H₁₁; R'' C₃H₇; R''' C₃H₇
R CH₃O; R' C₅H₁₁; R'' C₄H₉; R''' C₇H₁₄

-continued

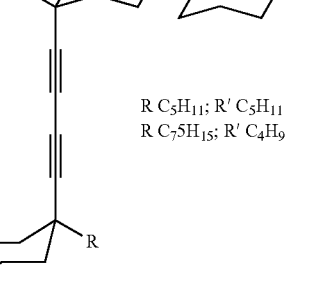

R C₅H₁₁; R' C₅H₁₁
R C₇₅H₁₅; R' C₄H₉

In some possible implementations, the liquid crystal can also use any one or more of MAT-1370, MAT-1284, LCCC-17-435 and LCCC-17-1243.

In an exemplary embodiment, any one or more of the compounds having the following chemical formula can be used as the liquid crystal polymerized monomer:

(A1)
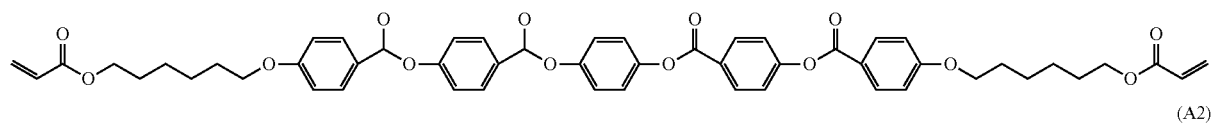

(A2)
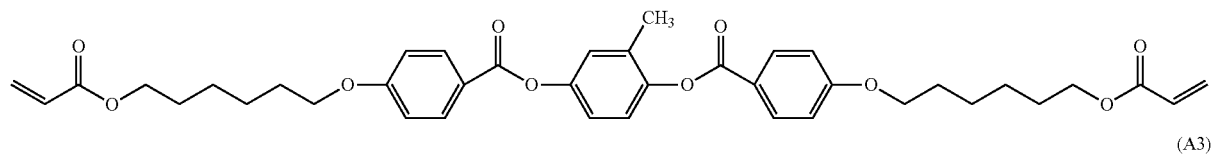

(A3)
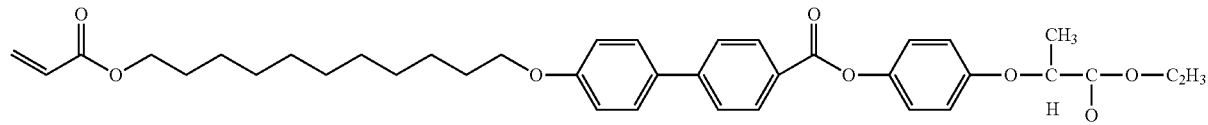

(A4)
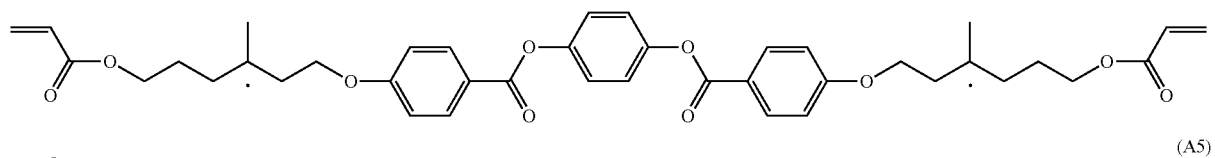

(A5)
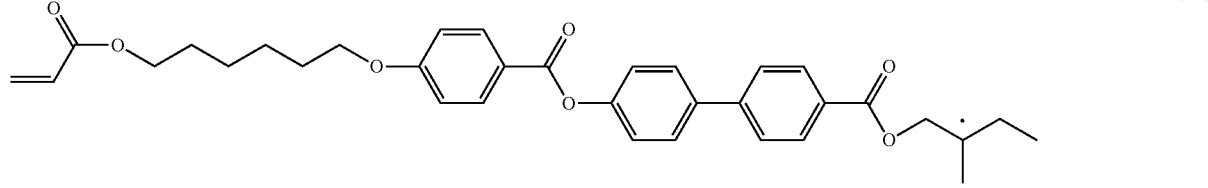

(A6)
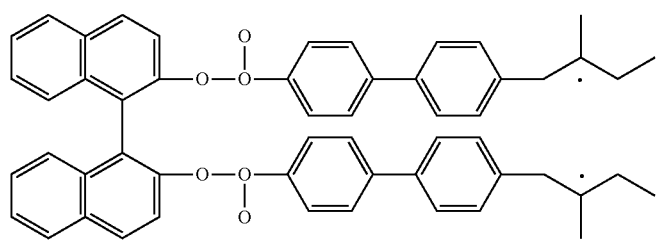

In some possible implementations, polyethylene glycol diglycidyl ether can be a compound with the following chemical formula:

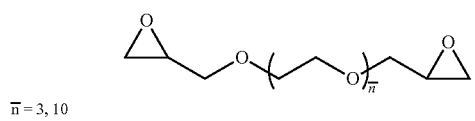

n̄ = 3, 10

Bisphenol F epoxy resin can be a compound with the following chemical formula:

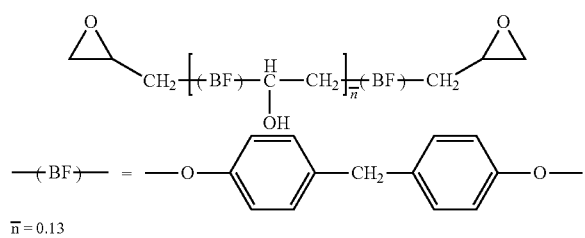

n̄ = 0.13

Trimethylolpropane triglycidyl ether can be a compound with the following chemical formula:

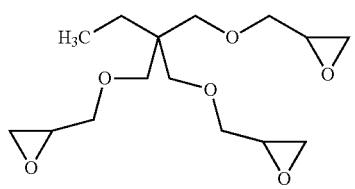 [SMILES: CCC(COCC1CO1)(COCC1CO1)COCC1CO1]

Pentaerythritol glycidyl ether can be a compound with the following chemical formula:

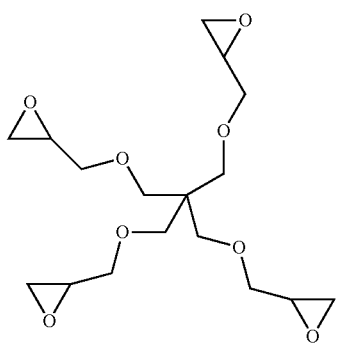 [SMILES: C(OCC(COCC1CO1)(COCC1CO1)COCC1CO1)C1CO1]

In an exemplary embodiment, the compensation layer 40 may be formed by heating the polymer liquid crystal composite film or irradiating ultraviolet light. In an exemplary embodiment, the thickness of the compensation layer 40 may be about 0.8 μm to 2.5 μm.

In an exemplary embodiment, the refractive index nx in the X-axis direction and the refractive index ny in the Y-axis direction in the compensation layer 40 can be adjusted by adjusting the process parameters of ultraviolet light such as wavelength, light intensity, irradiation time, heating temperature and heating time, so as to adjust the phase retardation of light passing through the compensation layer 40 so that the sum of the phase retardation of light passing through the compensation layer 40 and the phase retardation of light passing through the liquid crystal layer in the display panel is an integral multiple of the wavelength of incident light. Alternatively, by adjusting the thickness of the polymer liquid crystal composite film, the thickness of the compensation layer 40 can be adjusted, and then the phase retardation of the light passing through the compensation layer 40 can be adjusted, so that the sum of the phase retardation of the light passing through the compensation layer 40 and the phase retardation of the light passing through the liquid crystal layer in the display panel is an integral multiple of the wavelength of the incident light.

Figure 13:
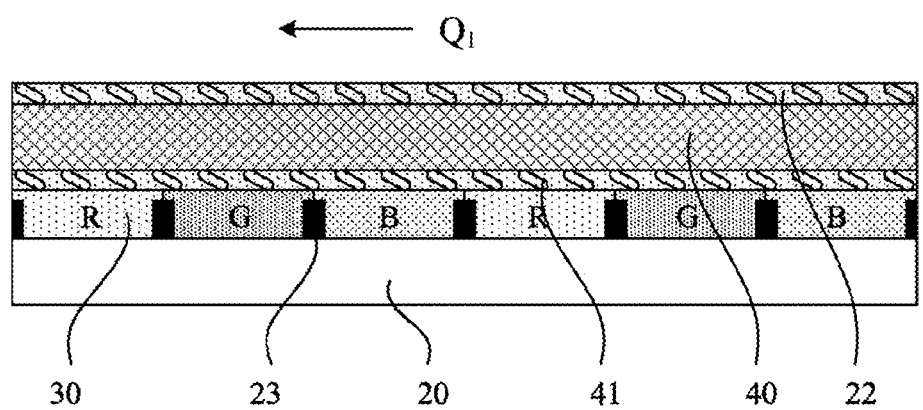
FIG. 13 is a schematic diagram after formation of a pattern of a second alignment layer according to an embodiment of the present disclosure.

(5) A second alignment layer is prepared, including: a rubbing film is coated on the opposite base substrate 20 with the above pattern and is rubbed with a rubbing device to form a second alignment layer 22, as shown in FIG. 13. In an exemplary embodiment, the rubbing device rubs the rubbing film along the first rubbing direction Q1, and the grooves formed on the second alignment layer 22 will align the liquid crystal molecules according to the first initial posture. That is, the rubbing direction of the second alignment layer 22 is the same as that of the first alignment layer 12.

III. Part II

Figure 14:
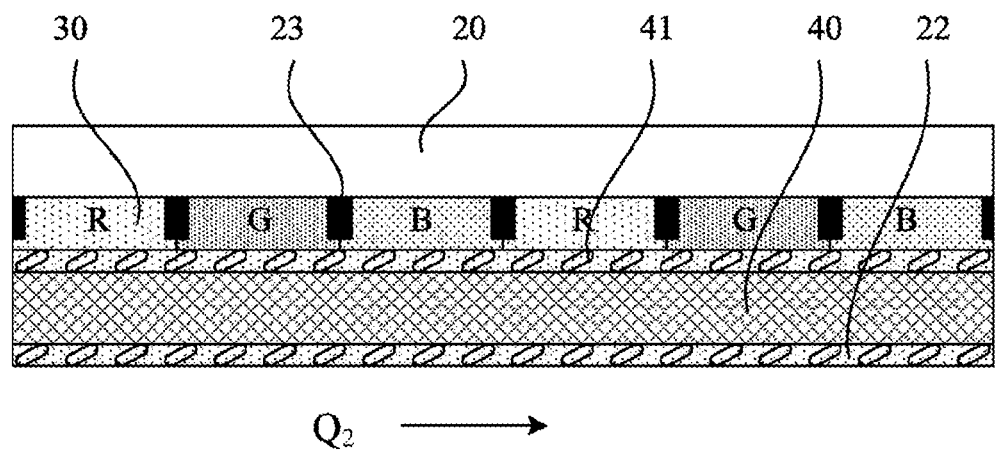
FIG. 14 is a schematic diagram of the embodiment of the present disclosure after an opposite substrate is turned over.
Figure 15:
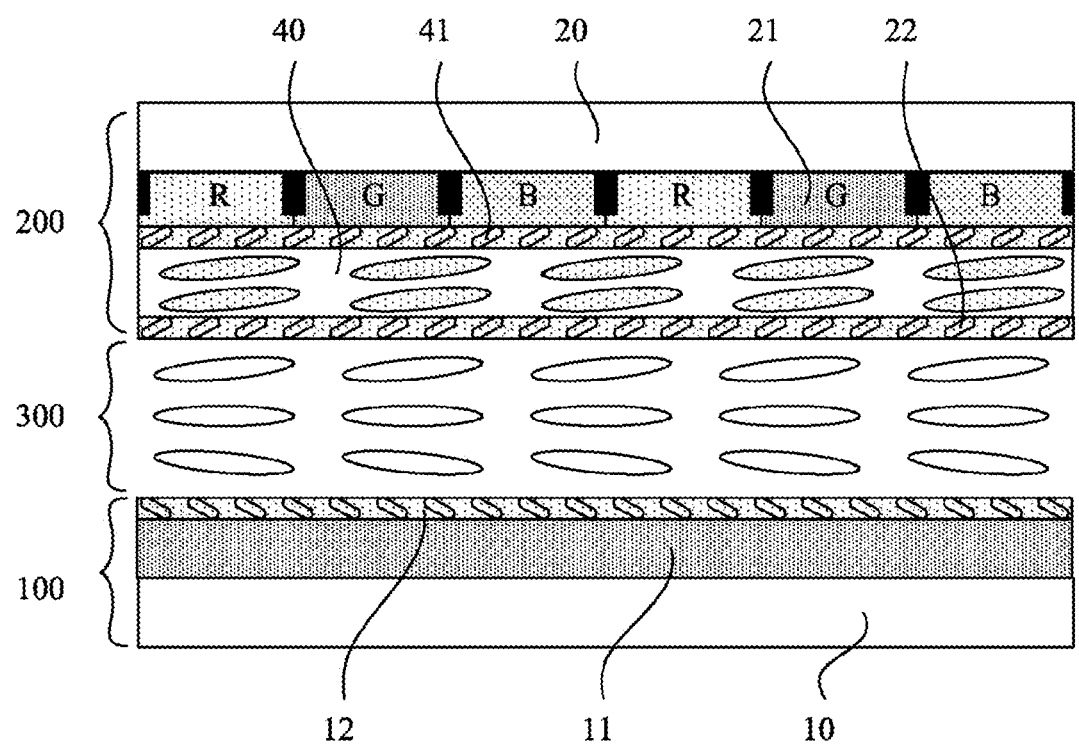
FIG. 15 is a schematic diagram of the embodiment of the present disclosure after cell aligning is completed.

The cell aligning process includes: the opposite substrate 200 is turned over so that the second alignment layer 22 on the opposite substrate 200 faces the array substrate 100, as shown in FIG. 14. The turnover is equivalent to changing the rubbing direction of the second alignment layer 22 and the third alignment layer 41 on the opposite substrate 200 to the second rubbing direction Q2, which is opposite to the first rubbing direction Q1, hence, the liquid crystal molecules near the second alignment layer 22 and the third alignment layer 41 will be aligned according to the second initial posture and the third initial posture. Subsequently, a sealing body is coated on the non-display area of the array substrate, liquid crystal is dripped on the display area of the array substrate, the opposite substrate 200 and the array substrate 100 relatively close to each other are aligned and pressed under vacuum condition, and the sealant is cured by ultraviolet curing and/or heatcuring, thus completing the cell aligning process to form the display panel. as shown in FIG. 15.

In this way, in the liquid crystal panel prepared in this embodiment, the liquid crystal molecules near the first alignment layer 12 in the liquid crystal layer 300 have a first initial posture, after the opposite substrate 200 is turned over, the liquid crystal molecules near the second alignment layer 22 in the liquid crystal layer 300 have a second initial posture, and the liquid crystal molecules in the compensation layer 40 have the third initial posture. The initial posture of the liquid crystal molecules near the second alignment layer 22 and the initial posture of the liquid crystal molecules near the first alignment layer 12 are thus made mirror symmetric with respect to the central horizontal plane of the liquid crystal layer 300, and the initial posture of the liquid crystal molecules in the compensation layer 40 and the initial posture of the liquid crystal molecules near the first alignment layer 12 are mirror symmetric with respect to the central horizontal plane of the liquid crystal layer 300, that is, the initial posture of the liquid crystal molecules in the compensation layer 40 is the same as the initial posture of the liquid crystal molecules near the second alignment layer 22.

In an exemplary embodiment, when the compensation layer 40 has positive dispersion characteristics, and the liquid crystal layer 300 uses liquid crystal with negative dispersion characteristics. When the compensation layer 40 has negative dispersion characteristics, the liquid crystal layer 300 adopts liquid crystal with positive dispersion characteristics. The material of the liquid crystal layer can be selected from mature products according to actual demand, as long as it can meet the requirements of high stability, moderate birefringence, low viscosity, large dielectric anisotropy, high resistance, high voltage retention, wide temperature range, good alignment and so on, which is not limited here.

In some possible implementations, the array substrate 100 may be turned over, so that the first alignment layer 12 on the array substrate 100 faces the opposite substrate 200. In some possible implementations, the sealant may be coated on the array substrate or on the opposite substrate. In some possible implementations, the liquid crystal can be dripped on the array substrate or on the opposite substrate, which is not limited in the present disclosure.

The preparation process of the display panel mentioned above is only an exemplary illustration. In practice, the array substrate and the opposite substrate can also be prepared by other methods. For example, the rubbing device can rub the rubbing film in the second rubbing direction to form a first alignment layer, a second alignment layer and a third alignment layer with the second rubbing direction respectively. For another example, before the rubbing film is formed on the array substrate and the opposite substrate, the planarization layer can be formed first, and then the rubbing film can be formed on the planarization layer. For example, the rubbing process can adopt optical rubbing process, which is not limited in this disclosure.

It can be seen from the preparation process of the display panel in this embodiment that, the dispersion characteristics of the liquid crystal layer and the compensation layer are opposite, the first initial posture of the liquid crystal near the array substrate and the second initial posture of the liquid crystal near the opposite substrate are configured to be mirror symmetric with respect to the horizontal plane, and the third initial posture of the liquid crystal in the compensation layer is configured to be the same as the second initial posture of the liquid crystal near the opposite substrate, which not only effectively improves the problems of dark-state light leakage and empurple, but also effectively improves the problem with color cast, and achieves dispersion-free and improves the L0 picture quality. The process flow for preparing the display panel in this embodiment is basically the same as that in some technologies, which can be achieved by using mature manufacturing equipment, with little process improvement, high compatibility, simple process realization, wide material sources, low cost, and easy implementation, and therefore has a good application prospect.

Figure 16:
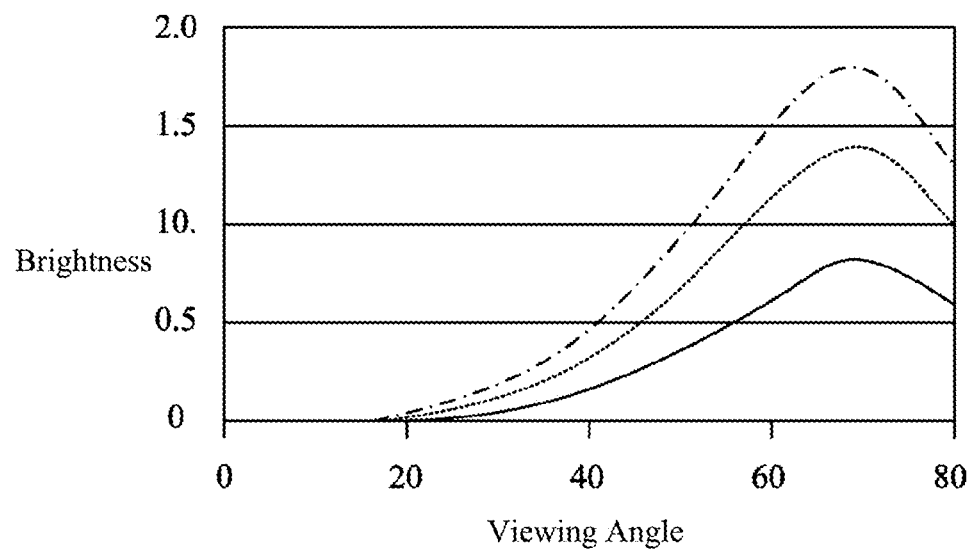
FIG. 16 is a schematic diagram of improving light leakage of a display panel according to an embodiment of the present disclosure.

FIG. 16 is a schematic diagram of improving light leakage of a display panel according to an embodiment of the present disclosure, in which the dotted line is the light leakage simulation result of display panel structure in some technologies, the dashed line is the light leakage simulation result of display panel structure with compensation layer, and the solid line is the light leakage simulation result of display panel structure with a compensation layer and a rubbing direction provided. In the display panel of the disclosed embodiments, the dispersion characteristics of the liquid crystal layer and the compensation layer are opposite, and the rubbing direction is set so that the initial posture of the liquid crystal near the first alignment layer and the initial posture of the liquid crystal near the second alignment layer are mirror symmetrical with respect to the central horizontal plane of the liquid crystal layer, and the initial posture of the liquid crystal in the compensation layer is the same as the initial posture of the liquid crystal of the liquid crystal near the second alignment layer. As shown in FIG. 16, in a larger viewing angle range, the light leakage brightness of the display panel structure in some technologies is higher. After the compensation layer is provided, the brightness of light leakage is reduced, and after the compensation layer is provided and the rubbing direction is configured, the light leakage brightness is effectively reduced.

Figure 17:
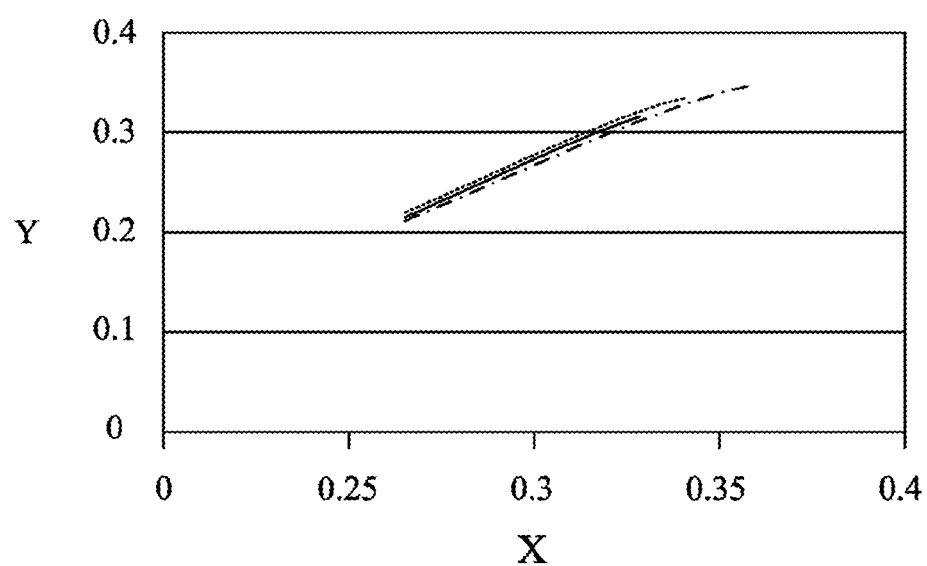
FIG. 17 is a schematic diagram of improving color cast of a display panel according to an embodiment of the present disclosure.

FIG. 17 is a schematic diagram of improving color cast of a display panel according to an embodiment of the present disclosure, in which the dotted line is the color cast simulation result of display panel structure in some technologies, the dashed line is the color cast simulation result of display panel structure with compensation layer, and the solid line is the color cast simulation result of display panel structure with a compensation layer and a rubbing direction provided, herein, X is the horizontal axis of color coordinates and Y is the vertical axis of color coordinates. In the display panel of the disclosed embodiments, the dispersion characteristics of the liquid crystal layer and the compensation layer are opposite, and the rubbing direction is set so that the initial posture of the liquid crystal near the first alignment layer and the initial posture of the liquid crystal near the second alignment layer are mirror symmetrical with respect to the central horizontal plane of the liquid crystal layer, and the initial posture of the liquid crystal in the compensation layer is the same as the initial posture of the liquid crystal of the liquid crystal near the second alignment layer. As shown in FIG. 17, in some technologies, the color coordinate deviation of the display panel structure is relatively large and there is a serious deviation of color. After the compensation layer is provided, the color deviation is improved. After the compensation layer is provided and the rubbing direction is configured, the color coordinate deviation is reduced and the color cast is effectively improved.

Figure 18:
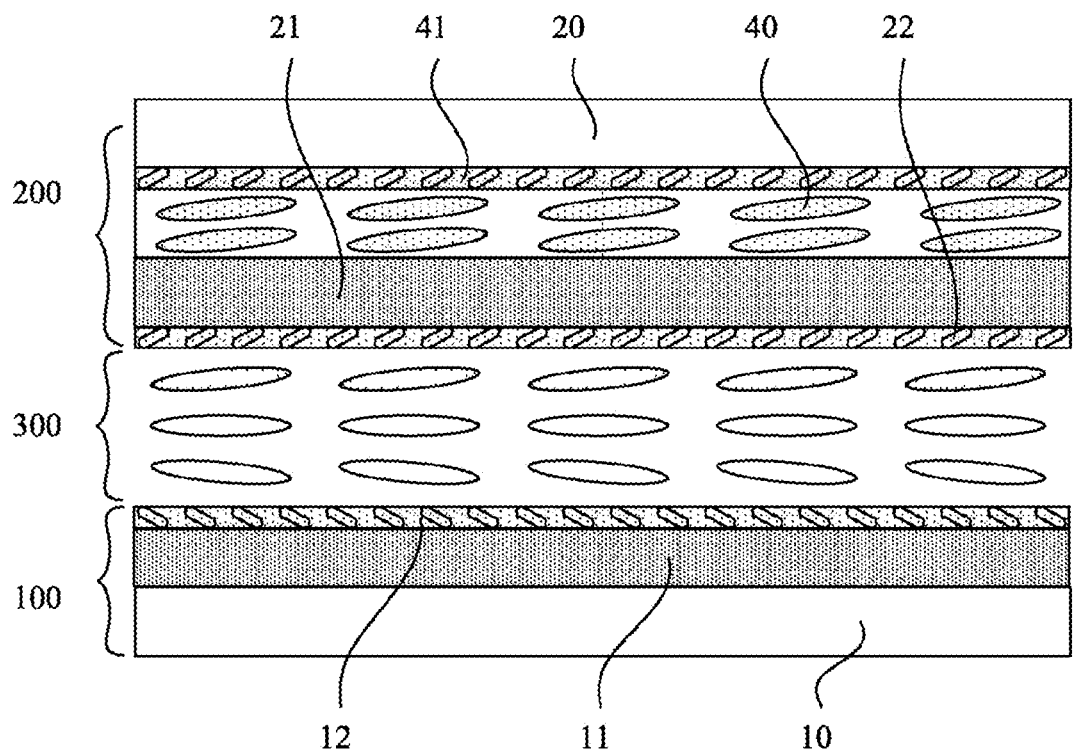
FIG. 18 is a schematic diagram of another structure of a display panel according to an embodiment of the present disclosure.

FIG. 18 is a schematic diagram of another structure of a display panel according to an embodiment of the present disclosure. In FIG. 18, a structure in which a compensation layer is arranged on a side of an opposite substrate is illustrated. The display panel may include an array substrate 100 and an opposite substrate 200 that are disposed oppositely, and a liquid crystal layer 300 disposed between the array substrate 100 and the opposite substrate 200. The array substrate 100 may include an array base substrate 10, an array structure layer 11 arranged on the surface of the array base substrate 10 facing the opposite substrate 200, and a first alignment layer 12 arranged on the surface of the array structure layer 11 facing the opposite substrate 200. The opposite substrate 200 may include a opposite base substrate 20, an opposite structure layer 21, a compensation layer 40, a second alignment layer 22 and the third alignment layer 41. As shown in FIG. 18, the third alignment layer 41 is arranged on the surface of the opposite base substrate 20 facing the array substrate 100, the compensation layer 40 is arranged on the surface of the third alignment layer 41 facing the array substrate 100, the opposite structure layer 21 is arranged on the surface of the compensation layer 40 facing the array substrate 100, and the second alignment layer 22 is arranged on the surface of the opposite structure layer 21 facing the array substrate 100.

Figure 19:
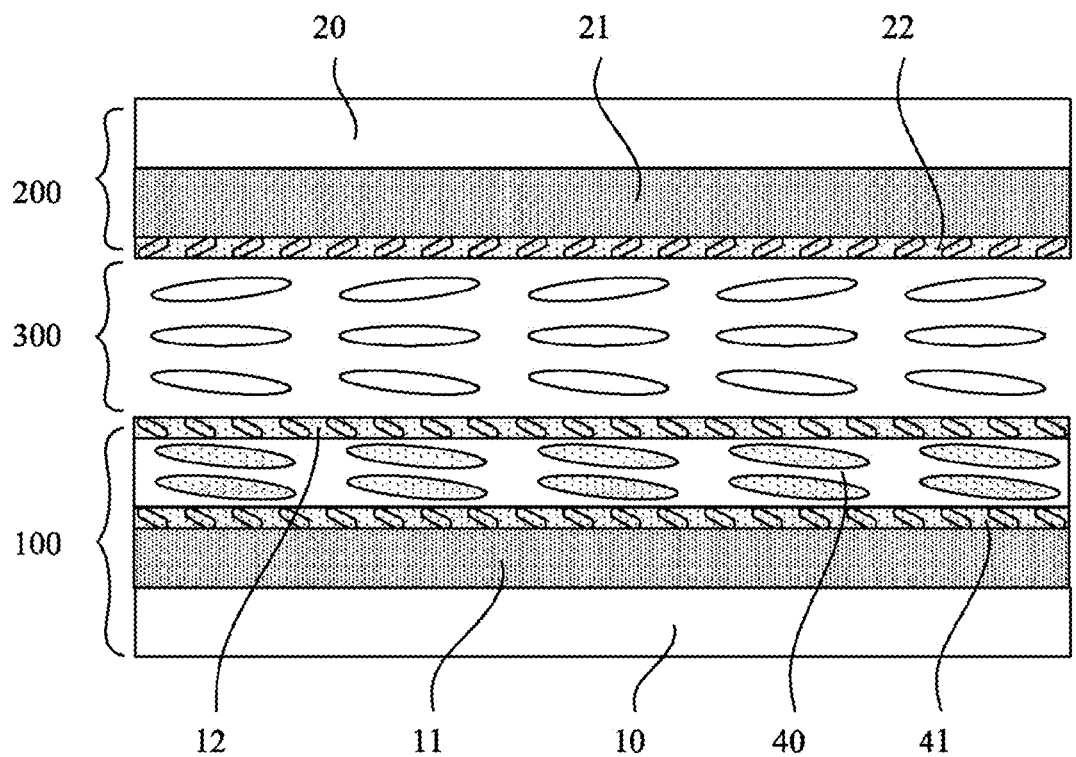
FIG. 19 is a schematic diagram of yet another structure of a display panel according to an embodiment of the present disclosure.

FIG. 19 is a schematic diagram of yet another structure of a display panel according to an embodiment of the present disclosure. In FIG. 19, a structure in which a compensation layer is arranged on a side of an array substrate is illustrated. The display panel may include an array substrate 100 and an opposite substrate 200 that are disposed opposite to each other, and a liquid crystal layer 300 provided between the array substrate 100 and the opposite substrate 200. As shown in FIG. 19, the compensation layer 40 is arranged on a side of the array substrate 100. In an exemplary embodiment, the opposite substrate 200 may include a opposite base substrate 20, an opposite structure layer 21 arranged on a surface of the opposite base substrate 20 facing the array substrate 100, and a second alignment layer 22 arranged on a surface of the opposite structure layer 21 facing the array substrate 100. The array substrate 100 may include an array base substrate 10, an array structure layer 11 arranged on the surface of the array base substrate 10 facing the opposite substrate 200, a third alignment layer 41 arranged on the surface of the array structure layer 11 facing the opposite substrate 200, a compensation layer 40 arranged on the surface of the third alignment layer 41 facing the opposite substrate 200, and a first alignment layer 12 arranged on the surface of the compensation layer 40 facing the opposite substrate 200. In some possible implementations, the compensation layer 40 and the third alignment layer 41 may be disposed between the array base substrate 10 and the array structure layer 11.

The display panel structure shown in FIG. 18 and FIG. 19 not only effectively improves the problem of dark light leakage and empurple, but also effectively improves the problem of color cast.

Based on the technical idea of the foregoing embodiments, an embodiment of present disclosure further provides a method for manufacturing a display panel. The manufacturing method of the display panel may include:

S1, an array substrate and an opposite substrate are respectively prepared, wherein a compensation layer are formed on the array substrate or the opposite substrate;

S2, a liquid crystal layer is formed between the array substrate and the opposite substrate;

In an exemplary embodiment, an included angle between an optical axis direction of the compensation layer and an initial optical axis direction of the liquid crystal molecules in the liquid crystal layer is less than or equal to 10 degrees, dispersion characteristics of the liquid crystal layer and the compensation layer are the opposite of each other, and the compensation layer is configured in such a way that the sum of a phase retardation of light passing through the compensation layer and a phase retardation of light passing through the liquid crystal layer is an integral multiple of a light wavelength.

In an exemplary embodiment, the liquid crystal layer has positive dispersion characteristics and the compensation layer has negative dispersion characteristics; alternatively, the liquid crystal layer has negative dispersion characteristics and the compensation layer has positive dispersion characteristics.

In an exemplary embodiment, the compensation layer with positive dispersion characteristics includes a positive double zigzag uniaxial plate with positive dispersion characteristics, and the compensation layer with negative dispersion characteristics includes a positive double zigzag uniaxial plate with negative dispersion characteristics.

In an exemplary embodiment, preparing the array substrate in act S1 may include: an array structure layer is formed on the array base substrate, and a first alignment layer is formed on the array structure layer.

In an exemplary embodiment, preparing the opposite substrate in act S1 may include: an opposite structure layer is formed on the opposite base substrate, a compensation layer is formed on the opposite structure layer, and a second alignment layer is formed on the compensation layer; or, a compensation layer is formed on the opposite base substrate, an opposite structure layer is formed on the compensation layer, and a second alignment layer is formed on the opposite structure layer.

In an exemplary embodiment, the first alignment layer is configured to make the liquid crystal near the first alignment layer in the liquid crystal layer have a first initial posture, and the second alignment layer is configured to make the liquid crystal near the second alignment layer have a second initial posture; and the first alignment layer and the second alignment layer have a same rubbing direction, making the first initial posture and the second initial posture mirror symmetric with respect to the central horizontal plane of the liquid crystal layer.

In the exemplary embodiment, forming a compensation layer may include:

forming a third alignment layer on the opposite base substrate or the opposite structure layer, and forming a compensation layer on the third alignment layer; and the third alignment layer and the second alignment layer having a same rubbing direction, making the liquid crystal in the compensation layer having the same posture as the second initial posture.

The process for manufacturing the display panel has been described in detail in the previous embodiments and will not be repeated here.

An embodiment of the present disclosure further provides a display apparatus, including the horizontal electric field display panel described above.

In an exemplary embodiment, the display apparatus may be any product or component with a display function such as a mobile phone, a tablet computer, a television, a display, a laptop computer, a digital photo frame, a navigator, etc.

Although the implementations of the present disclosure are disclosed above, the contents are only implementations adopted to easily understand the present disclosure and not intended to limit the present disclosure. Those skilled in the art may make any modifications and variations to implementation forms and details without departing from the spirit and scope disclosed by the present disclosure. However, the scope of patent protection of the present disclosure should also be subject to the scope defined by the appended claims.

The invention claimed is:

1. A display panel, comprising: an array substrate and an opposite substrate, which are oppositely arranged, and a liquid crystal layer, which is arranged between the array substrate and the opposite substrate, wherein:

a compensation layer is arranged on the array substrate or the opposite substrate, and an included angle between an optical axis direction of the compensation layer and an initial optical axis direction of liquid crystal molecules in the liquid crystal layer is less than or equal to 10 degrees;

dispersion characteristics of the liquid crystal layer and the compensation layer are the opposite of each other, and the compensation layer is configured in such a way that the sum of a phase retardation of light passing through the compensation layer and a phase retardation of light passing through the liquid crystal layer is an integral multiple of a light wavelength;

the array substrate comprises an array base substrate, an array structure layer arranged on a side of the array substrate facing the opposite substrate, and a first alignment layer arranged on a side of the array structure layer facing the opposite substrate;

the opposite substrate comprises an opposite base substrate, an opposite structure layer arranged on a side of the opposite substrate facing the array substrate, and a second alignment layer arranged on a side of the opposite structure layer facing the array substrate;

the first alignment layer is configured to make a liquid crystal near the first alignment layer in the liquid crystal layer have a first initial posture, and the second alignment layer is configured to make a liquid crystal near the second alignment layer have a second initial posture;

the first initial posture and the second initial posture are mirror symmetric with respect to a central horizontal plane of the liquid crystal layer;

the opposite structure layer comprises a color filter layer arranged on a side of the opposite base substrate facing the array substrate and the compensation layer arranged on a side of the color filter layer facing the array substrate; or, the opposite structure layer comprises the compensation layer arranged on a side of the opposite base substrate facing the array substrate and a color filter layer arranged on a side of the compensation layer facing the array substrate; and the opposite substrate further comprises a third alignment layer, which is arranged on a side of the compensation layer facing the opposite base substrate, and is configured to make the liquid crystal in the compensation layer have the same posture as the second initial posture.

2. The display panel of claim 1, wherein the compensation layer is arranged on a side of the opposite substrate facing the array substrate, or the compensation layer is arranged on a side of the array substrate facing the opposite substrate.

3. The display panel of claim 1, wherein the liquid crystal layer has positive dispersion characteristics and the compensation layer has negative dispersion characteristics; or, the liquid crystal layer has negative dispersion characteristics and the compensation layer has positive dispersion characteristics.

4. The display panel of claim 3, wherein the compensation layer with positive dispersion characteristics comprises a positive double zigzag uniaxial plate with positive dispersion characteristics, and the compensation layer with negative dispersion characteristics comprises a positive double zigzag uniaxial plate with negative dispersion characteristics.

5. The display panel of claim 4, wherein
the positive double zigzag uniaxial plate with positive dispersion characteristics comprises: 20% to 45% by weight of liquid crystal, 5% to 35% by weight of liquid crystal polymerized monomer, 0.05% to 19.5% by weight of polymerized monomer and 0.05% to 0.5% by weight of initiator; and
the positive double zigzag uniaxial plate with negative dispersion characteristics comprises: 15% to 41% by weight of liquid crystal, 5% to 31% by weight of liquid crystal polymerized monomer, 0.05 to 15.5% by weight of polymerized monomer, 0.05 to 0.5% by weight of initiator and 1.0 to 12% by weight of additive.

6. A display apparatus, comprising the display panel of claim 1.

7. A method for preparing a display panel, comprising:
respectively preparing an array substrate and an opposite substrate, wherein a compensation layer are formed on the array substrate or the opposite substrate;
forming a liquid crystal layer between the array substrate and the opposite substrate;
wherein:
an included angle between an optical axis direction of the compensation layer and an initial optical axis direction of the liquid crystal molecules in the liquid crystal layer is less than or equal to 10 degrees, dispersion characteristics of the liquid crystal layer and the compensation layer are the opposite of each other, and the compensation layer is configured in such a way that the sum of a phase retardation of light passing through the compensation layer and a phase retardation of light passing through the liquid crystal layer is an integral multiple of a light wavelength;
preparing the array substrate comprises: forming an array structure layer on an array base substrate, and forming a first alignment layer on the array structure layer; and
preparing the opposite substrate, comprises: forming an opposite structure layer on an opposite base substrate, forming the compensation layer on the opposite structure layer, and forming a second alignment layer on the compensation layer; or, forming the compensation layer on the opposite base substrate, forming the opposite structure layer on the compensation layer, and forming a second alignment layer on the opposite structure layer;
the first alignment layer is configured to make the liquid crystal near the first alignment layer in the liquid crystal layer have a first initial posture, and the second alignment layer is configured to make the liquid crystal near the second alignment layer have a second initial posture; and the first alignment layer and the second alignment layer have a same rubbing direction, making the first initial posture and the second initial posture mirror symmetric with respect to the central horizontal plane of the liquid crystal layer; and
forming the compensation layer comprises:
forming a third alignment layer on the opposite base substrate or the opposite structure layer, and forming the compensation layer on the third alignment layer; and
the third alignment layer and the second alignment layer having a same rubbing direction, making a liquid crystal in the compensation layer having the same posture as the second initial posture.

8. The preparation method of claim 7, wherein the liquid crystal layer has positive dispersion characteristics and the compensation layer has negative dispersion characteristics; or, the liquid crystal layer has negative dispersion characteristics and the compensation layer has positive dispersion characteristics.

9. The preparation method of claim 8, wherein the compensation layer with positive dispersion characteristics comprises a positive double zigzag uniaxial plate with positive dispersion characteristics, and the compensation layer with negative dispersion characteristics comprises a positive double zigzag uniaxial plate with negative dispersion characteristics.

* * * * *